United States Patent
Wada

(10) Patent No.: US 7,767,286 B2
(45) Date of Patent: Aug. 3, 2010

(54) POLARIZING PLATE AND LIQUID CRYSTAL DISPLAY DEVICE

(75) Inventor: Minoru Wada, Minami-ashigara (JP)

(73) Assignee: Fujifilm Corporation, Minato-Ku, Tokyo (JP)

(\*) Notice: Subject to any disclaimer, the term of this patent is extended or adjusted under 35 U.S.C. 154(b) by 221 days.

(21) Appl. No.: 12/005,280

(22) Filed: Dec. 27, 2007

(65) Prior Publication Data

US 2008/0158485 A1 Jul. 3, 2008

(30) Foreign Application Priority Data

Dec. 28, 2006 (JP) ............................ 2006-354731
Dec. 17, 2007 (JP) ............................ 2007-324276

(51) Int. Cl.
*C09K 19/00* (2006.01)
*C09K 19/06* (2006.01)
*C09K 19/52* (2006.01)
*B32B 3/10* (2006.01)

(52) U.S. Cl. .................. 428/131; 430/1.1; 430/20; 349/1; 349/56; 349/96; 252/299.01

(58) Field of Classification Search .................. 349/1, 349/56, 96; 428/1.1, 131; 430/20; 252/299.01
See application file for complete search history.

(56) References Cited

U.S. PATENT DOCUMENTS

2007/0148485 A1\* 6/2007 Kusama et al. .............. 428/520
2007/0166537 A1\* 7/2007 Nagamoto et al. ..... 428/355 AC

FOREIGN PATENT DOCUMENTS

| JP | 2001-264538 A | 9/2001 |
|---|---|---|
| JP | 2002-122739 A | 4/2002 |
| JP | 2002-122740 A | 4/2002 |

\* cited by examiner

*Primary Examiner*—Geraldina Visconti
(74) *Attorney, Agent, or Firm*—Buchanan Ingersoll & Rooney PC

(57) ABSTRACT

A novel polarizing plate is disclosed. The polarizing plate comprises at least a polarizing film, a pressure-sensitive adhesive layer, and an optical compensation sheet, having an absolute value of Y, defined by the following equation, equal to or smaller than $6.0 \times 10^{-4}$:

$$Y = -7.0 \times 10^5 \times Cn + 4.3 \times 10^{-13} \times E - 1.34 \times 10^{-3}$$

where $Cn$ (1/Pa) is photoelastic modulus of said pressure-sensitive adhesive layer and $E$ (Pa) is modulus of elasticity of said optical compensation sheet.

10 Claims, 4 Drawing Sheets

POLARIZING PLATE AND LIQUID CRYSTAL DISPLAY DEVICE

CROSS-REFERENCE TO RELATED APPLICATIONS

This application claims benefit of priority under 35 U.S.C. 119 to Japanese Patent Application Nos. 2006-354731 filed Dec. 28, 2006 and 2007-324276 filed Dec. 17, 2007; and the entire contents of the applications are incorporated herein by reference.

BACKGROUND OF THE INVENTION

1. Field of the Invention

The present invention relates to a polarizing plate and a liquid crystal display device using the same, and more specifically to a polarizing plate provided with a pressure-sensitive adhesive layer and an optical compensation sheet, less causative of light-leakage due to thermally induced distortion, and a liquid crystal display device using such polarizing plate, capable of providing high-definition images.

2. Related Art

A liquid crystal display device comprises a polarizing plate and a liquid crystal cell. A TN-mode TFT liquid crystal display device, which is in the main stream at present, employs an optical compensation sheet (retardation film) disposed between the polarizing plate and the liquid crystal cell to achieve a high-displaying quality. However under severe conditions of use, the liquid crystal display device may produce unexpected retardation at the end portion thereof due to thermally induced distortion, and the retardation may cause frame-like light-leakage (elevation in transmittance at the end portion of the liquid crystal display device) in the black state.

Japanese Laid-Open Patent Publication No. 2001-264538 proposes an optical compensation plate less susceptible to changes in the retardation characteristics, having a pressure-sensitive adhesive layer provided to the retardation film, wherein product (Y) of photoelastic coefficient ($m^2/N$) of a retardation film and modulus of elasticity ($N/m^2$) of a pressure-sensitive adhesive layer satisfies $Y<1.2\times10^{-5}$. Japanese Laid-Open Patent Publication No. 2002-122739 proposes a predetermined polarizing plate moderated in the phenomenon of light-leakage, wherein a product of linear expansion coefficient of a polarizing plate protective layer and modulus of elasticity of a pressure-sensitive adhesive layer is $1.0\times10^{-5}$ (° $C.^{-1}$·MPa) or smaller. Japanese Laid-Open Patent Publication No. 2002-122740 proposes a polarizing plate less causative of in-plane non-uniformity, wherein a product of photoelastic coefficient of a polarizing plate protective layer and modulus of elasticity of a pressure-sensitive adhesive layer is $8.0\times10^{-12}$ ($m^2/N$·MPa) or smaller.

SUMMARY OF THE INVENTION

However, still more excellent performance in terms of durability has been required for the polarizing plate incorporated thereinto.

It is therefore an object of the present invention to provide a highly durable polarizing plate less causative of light-leakage generated due to distortion induced by heat or the like, and a liquid crystal display device using the polarizing plate, providing high-definition images. It is another object of the present invention to provide a novel pressure-sensitive adhesive used for producing polarizing plates.

The present inventor conducted various studies on phenomenon of light-leakage observed in an liquid crystal panel exposed to heat (typically a liquid crystal panel subjected to a heat treatment, which causes distinctive light-leakage generated due to thermal distortion, for example, a treatment of heating it in a dryer at 60° C. for 17 hours), and found out that the retardation due to heating or the like occurs not only in the optical compensation sheet disposed between the polarizing plates, but also in the pressure-sensitive adhesive layer which is between the polarizing plates. From further investigations based on these findings, the inventor also found that the pressure-sensitive adhesive layer becomes to have retardation of which magnitude depends on its photoelastic coefficient of the pressure-sensitive adhesive layer in a direction so as to contribute to increasing retardation of the optical compensation sheet, and that the light-leakage generated due to thermal distortion increases depending on the photoelastic coefficient of the pressure-sensitive adhesive layer. The inventor still also found out that the amount of light-leakage due to thermal distortion depends also on modulus of elasticity of the optical compensation sheet.

The present inventor conducted further studies based on these findings, and found out that the photoelastic coefficient of the pressure-sensitive adhesive layer and modulus of elasticity of the optical compensation sheet are in specific correlations with light-leakage, that a polarizing plate, which is improved in terms of light-leakage and has excellent performances, may be obtained, when the photoelastic coefficient of the pressure-sensitive adhesive layer and modulus of elasticity of the optical compensation sheet satisfy a predetermined relation, and then the present invention was made.

In one aspect, the invention provides a polarizing plate comprising at least a polarizing film, a pressure-sensitive adhesive layer, and an optical compensation sheet, having an absolute value of Y, defined by the following equation, equal to or smaller than $6.0\times10^{-4}$:

$$Y=7.0\times10^5 \times Cn+4.3\times10^{-13}\times E-1.34\times10^{-3}$$

where Cn (1/Pa) is photoelastic modulus of said pressure-sensitive adhesive layer and E (Pa) is modulus of elasticity of said optical compensation sheet.

As embodiments of the invention, there are provided the polarizing plate wherein said pressure-sensitive adhesive layer comprises an acrylic pressure-sensitive adhesive; and the polarizing plate wherein said acrylic pressure-sensitive adhesive comprises at least one species of polymer comprising a repeating unit derived from a monomer of which homopolymer has a positive photoelastic coefficient.

The polymer may be selected from any homopolymers or any copolymers of the monomer.

The polymer may be selected from any homopolymers or any copolymers comprising a repeating unit derived from a monomer represented by formula (1) below:

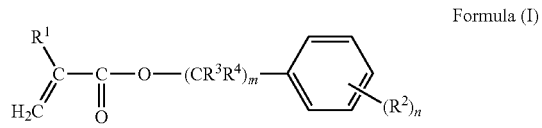

Formula (I)

where $R^1$ represents a hydrogen atom or methyl group; $R^2$ represents a hydrogen atom or substituent; each of $R^3$ and $R^4$ independently represents a hydrogen atom or substituent; m represents an integer of 0 or larger, n represents an integer from 0 to 5, and for the case where each of m and n is an integer of 2 or larger, a plurality of each of $R^2$, $R^3$ and $R^4$ may be same or different.

In the invention, the optical compensation sheet may have a photoelastic coefficient equal to or smaller than $50\times10^{-12}$ (1/Pa).

In another aspect, the invention provides a liquid crystal display device comprising at least a liquid crystal cell and the polarizing plate; and an acrylic pressure-sensitive adhesive to be used for polarizing plate, comprising at least one species of homopolymer or copolymer comprising at least one repeating unit derived from a monomer represented by formula (1) below:

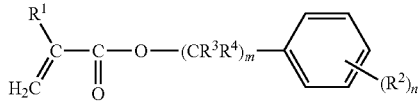

Formula (I)

where $R^1$ represents a hydrogen atom or methyl group; $R^2$ represents a hydrogen atom or substituent; each of $R^3$ and $R^4$ independently represents a hydrogen atom or substituent; m represents an integer of 0 or larger, n represents an integer from 0 to 5, and for the case where each of m and n is an integer of 2 or larger, a plurality of each of $R^2$, $R^3$ and $R^4$ may be same or different.

Figure 1:
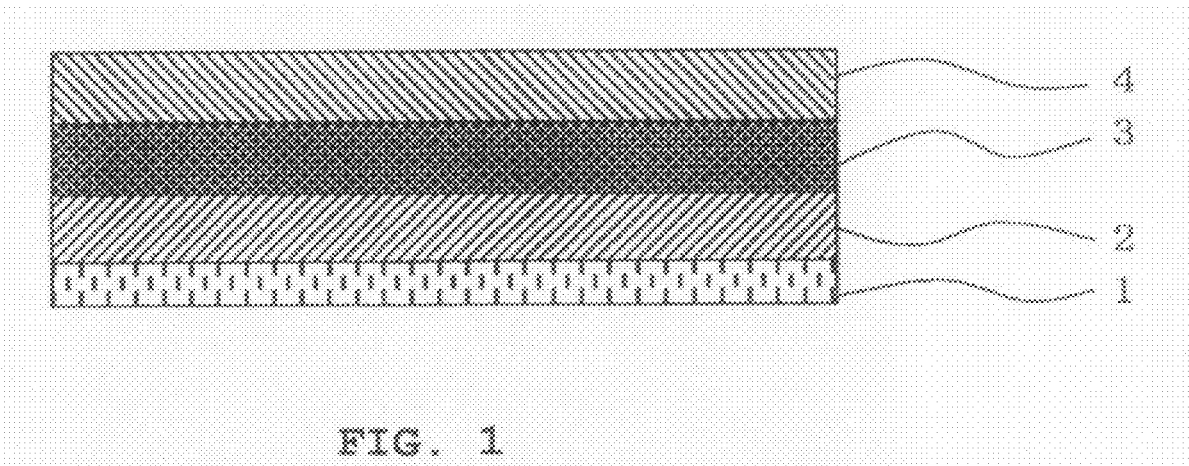
FIG. 1 is a schematic sectional view showing an exemplary polarizing plate of the present invention.

Reference numerals in the drawings mean as follows:

1 pressure-sensitive adhesive layer;
2 optical compensation sheet;
3 polarizing film;
4 protective layer; and
5 release paper.

DETAILED DESCRIPTION OF THE INVENTION

Paragraphs below will detail the present invention. It is to be understood that a word "to" is used for expressing the range including the numerals placed therebefore and thereafter as the lower limit and the upper limit, respectively.

First, the polarizing plate of the present invention will be described in details.

[Polarizing Plate]

The present invention relates to a polarizing plate comprising at least a polarizing film, a pressure-sensitive adhesive layer, and an optical compensation sheet, having an absolute value of Y, defined by the following equation, equal to or smaller than $6.0\times10^{-4}$:

$$Y=-7.0\times10^5\times Cn+4.3\times10^{-13}\times E-1.34\times10^{-3}$$

where Cn (1/Pa) is photoelastic modulus of said pressure-sensitive adhesive layer and E (Pa) is modulus of elasticity of said optical compensation sheet.

There is no special limitation on the lowest value of absolute value of Y, wherein effects of the present invention may be obtained so far as the value falls within the range from 0 to $6.0\times10^{-5}$. According to the present invention, the members employed in the polarizing plate, in particular the pressure-sensitive adhesive layer and the optical compensation sheet, are combined so as to cancel retardation respectively produced therein when heat or the like is applied to the liquid crystal display device, and the absolute value of Y defined by the equation in the above is consequently adjusted to $6.0\times10^{-5}$ or smaller. Therefore, the optical characteristics such as polarization characteristics of the polarizing plate may be hardly varied; and it is possible to provide a polarizing plate improved in its durability. As a consequence, the liquid crystal display device employing the polarizing plate of the present invention is prevented from causing frame-like elevation of transmissivity in the black state, even when being used under severe conditions such as high temperature, and is excellent in display quality.

Figure 2:
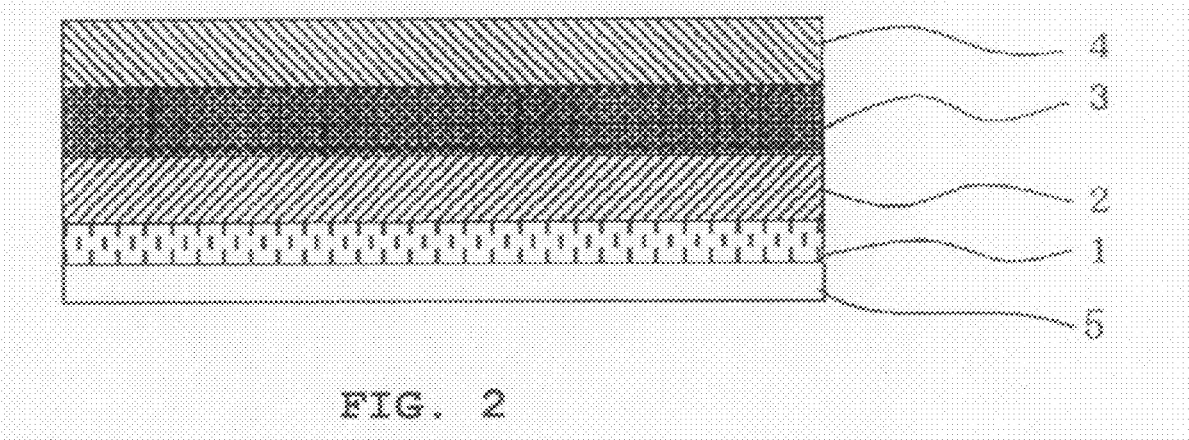
FIG. 2 is a schematic sectional view showing another exemplary polarizing plate of the present invention.

FIG. 1 shows a sectional view of an exemplary polarizing plate of the present invention. The polarizing plate has a pressure-sensitive adhesive layer 1, an optical compensation sheet 2, a polarizer film 3 and a protective layer 4 stacked in this order. The polarizing plate is incorporated into a liquid crystal display device so that it is attached to some other component, which is typically the surface of the a substrate of a liquid crystal cell, with the aid of the pressure-sensitive adhesive layer 1. Or, as shown in FIG. 2, the polarizing plate may be stored or transported, with a release paper 5 on the surface of the pressure-sensitive adhesive layer 1. The protective layer may preferably be composed of a polymer film having a transmittance of light of 80% or more. A cellulose acetate film may preferably be used as the polymer film. The cellulose acetate film may be same with that used for an optical compensation sheet or a support thereof described later.

While FIG. 1 and FIG. 2 showed the configurations in which the optical compensation sheet 2 also functions as a protective layer of the polarizer film 3, an additional protective layer composed of a material similar to that of the protective layer 4 may be disposed between the optical compensation sheet 2 and the polarizer film 3.

《Polarizer Film》

The polarizer film used for the polarizing plate of the present invention may be any one of iodine-containing polarizer film, dye-containing polarizer film using dichroic dye, and polyene-base polarizer film. The iodine-containing polarizer film and the dye-containing polarizer film are generally produced using polyvinyl alcohol-base film. Method of fabrication therefor may be any of those publicly known, and may be exemplified by a method described in the above-mentioned Japanese Laid-Open Patent Publication No. 2001-264538.

《Pressure-Sensitive Adhesive Layer》

For satisfying the above-described condition, the pressure-sensitive adhesive layer to be employed in the present invention preferably has a positive photoelastic coefficient. The pressure-sensitive adhesive layer is a layer containing at least one species of pressure-sensitive adhesive, and is capable of adhering to another member by being brought into contact with it. A pressure-sensitive adhesive (in the description, the term "pressure-sensitive adhesive" is used for any adhesives) to be used for producing the pressure-sensitive adhesive layer may be not specifically limited, so far as the resultant pressure-sensitive adhesive layer can satisfy the above-described condition for Y. Preferable examples of the pressure-sensitive adhesive include rubber base, acrylic base, silicone base, urethane base, polyether base and polyester base adhesives.

Examples of the monomer to be used for preparing acrylic polymer which is a base polymer of the acrylic pressure-sensitive adhesive include (meth)acrylate esters [(meth)acrylate generically means acrylate ester and methacrylate ester, and all names of compound given with (meth) will similarly be understood hereinafter]. Specific examples of such (meth) acrylate ester include methyl(meth)acrylate, ethyl(meth) acrylate, butyl(meth)acrylate, and 2-ethylhexyl(meth)acrylate, wherein they may be used independently or in combination. For the purpose of imparting polarity to the resultant acrylic polymer, a small amount of (meth)acrylic acid may be used in the place of a part of the (meth)acrylate ester. Still alternatively, glycidyl (meth)acrylate, 2-hydroxyethyl(meth)acrylate, or N-methylol(meth)acrylamide may be used together as a crosslinkable monomer. And any other co-polymerizable monomer, such as vinyl acetate, styrene or the like, may be used together, so far as the pressure-sensitive adhesive characteristics of (meth)acrylate ester polymer will not be impaired.

Examples of the base polymer of the rubber-base, pressure-sensitive adhesive include natural rubber, isoprene-base rubber, styrene-butadiene-base rubber, reclaimed rubber, polyisobutylene-base rubber, styrene-isoprene-styrene-base rubber, styrene-butadiene-styrene-base rubber, and so forth.

Examples of the base polymer of the silicone-base, pressure-sensitive adhesive include dimethyl polysiloxane, diphenyl polysiloxane, and so forth.

Examples of the base polymer of the polyether-base pressure-sensitive adhesive include polyvinyl ethyl ether, polyvinyl butyl ether, polyvinyl isobutyl ether, and so forth.

Larger photoelastic coefficient Cn of the pressure-sensitive adhesive layer is more preferable, wherein Cn is more preferably positive. Although the upper limit of the photoelastic coefficient is not specifically limited, materials available at present are supposed to have a maximum value of approximately $100 \times 10^{-12}$ (1/Pa). It is, however, to be understood that, depending on modulus of elasticity of the optical compensation sheet to be combined, it is a natural matter of course that the effects of the present invention are obtainable so far as Y defined by the equation in the above satisfies a predetermined condition, even if Cn of the pressure-sensitive adhesive layer is negative.

The photoelastic coefficient Cn of a pressure-sensitive adhesive layer (PET-W(S) from Sanritz Corporation) used at present for an optical compensation sheet of WV film from FUJIFILM Corporation was measured as $-750 \times 10^{-12}$ (1/Pa), showing a negative value.

The photoelastic coefficient of the pressure-sensitive adhesive layer may be adjustable to a desired value, by selecting a polymer as a major ingredient of the pressure-sensitive adhesive. Other possible methods may include the followings, but not limited thereto. As one of them, adjusting an optical isotropy, or intrinsic birefringence, of polymer molecules themselves is thought as an effective method. Examples of the method for adjusting the intrinsic birefringence include, but not limited to, (1) modification of molecular structure, (2) random co-polymerization, and (3) alloying, as described in "Kogaku-yo Tomei Jushi (Transparent Resin for Optical Applications" (published by Technical Information Institute Co., Ltd., 2001), p. 20, and these methods are applicable also to the present invention.

In addition, also a method of doping anisotropic lower molecules, described in "Seikei Kako (Molding)", Vol. 15, No. 3, P. 196 (2003), is preferably applicable to the invention.

Still also a method of doping anisotropic inorganic particles, disclosed in SCIENCE (2003), Vol. 301, p. 812, is preferably applicable to the invention.

In order to adjust the photoelastic coefficient of the pressure-sensitive adhesive layer to a desired value, molecular weight of the polymer used for preparing the pressure-sensitive adhesive or mixing ratio of the ingredients may be adjusted.

As for acrylic pressure-sensitive adhesive, most of those widely used at present have a negative photo-elastic modules, and the absolute value thereof is as large as approximately $800 \times 10^{-12}$ (1/Pa). The present inventor found out that, for the purpose of reducing the absolute value of the photoelastic coefficient, it is preferable to use a polymer, namely homopolymer or copolymer, comprising a repeating unit derived from a monomer of which homopolymer has a positive photoelastic coefficient. For example, a value of the photo-elastic modules of polymethyl methacrylate is $-3.8 \times 10^{-12}$ (1/Pa). On the other hand, a value of the photoelastic coefficient of polybenzyl methacrylate, polybenzyl acrylate and polyphenyl methacrylate falls within the range from approximately $+40 \times 10^{-12}$ to $+50 \times 10^{-12}$ (1/Pa). A polymer, homopolymer or copolymer, comprising a repeating unit derived from a monomer of which homopolymer has a positive photoelastic coefficient may preferably be used for preparing a base polymer of the pressure-sensitive adhesive. Examples of such monomer include aromatic acrylates and aromatic methacrylates such as benzyl methacrylate, benzyl acrylate, phenyl methacrylate and phenoxy alkyl acrylate (e.g., phenoxymethyl acrylate, phenoxypropyl acrylate and phenoxybutyl acrylate).

From these points of view, the pressure-sensitive adhesive layer preferably comprises an acrylic pressure-sensitive adhesive comprising a polymer (homopolymer or copolymer) prepared by carrying out polymerization of a polymerizable composition containing a compound represented by formula (1) as a major component.

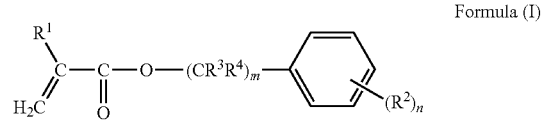

Formula (I)

In the formula, $R^1$ represents a hydrogen atom or methyl group; $R^2$ represents a hydrogen atom or substituent; each of $R^3$ and $R^4$ independently represents a hydrogen atom or substituent; m is an integer equal to or larger than 0, n is an integer from 0 to 5, and for the case where each of m and n is an integer of 2 or larger, a plurality of each of $R^2$, $R^3$ and $R^4$ may be same or different.

The formula (1) will be described in details.

In the formula (1), $R^1$ represents a hydrogen atom or methyl group, and preferably represents a methyl group.

$R^2$ represents a hydrogen atom or substituent. Examples of the substituent include Substituent Group T.

(Substituent Group T)

Halogen atoms such as fluorine, chlorine, bromine and iodine atoms; alkyls (preferably $C_{1-30}$ alkyls) such as methyl, ethyl, n-propyl, iso-propyl, tert-butyl, n-octyl, and 2-ethylhexyl; cylcoalkyls (preferably $C_{3-30}$ substituted or non-substituted cycloalkyls) such as cyclohexyl, cyclopentyl and 4-n-dodecylcyclohexyl; bicycloalkyls (preferably $C_5$-30 substitute or non-substituted bicycloalkyls, namely monovalent residues formed from $C_{5-30}$ bicycloalkanes from which a hydrogen atom is removed) such as bicyclo[1,2,2]heptane-2-yl and bicyclo[2,2,2]octane-3-yl; alkenyls (preferably $C_{2-30}$ alkenyls) such as vinyl and allyl; cycloalkenyls (preferably $C_{3-30}$ substituted or non-substituted cycloalkenyls, namely monovalent residues formed from $C_{3-30}$ cycloalkenes from which a hydrogen atom is removed) such as 2-cyclopentene-1-yl and 2-cyclohexene-1-yl; bicycloalkenyls (preferably $C_{5-30}$ substituted or non-substituted bicycloalkenyls, namely monovalent residues formed from $C_{5-30}$ bicycloalkenes from which a hydrogen atom is removed) such as bicyclo[2,2,1]hepto-2-en-1-yl and bicyclo[2,2,2]octo-2-en-4-yl; alkynyls (preferably $C_{2-30}$ substitute or non-substituted alkynyls) such as etynyl and propargyl; aryls (preferably $C_{6-30}$ substitute or non-substituted aryls) such as phenyl, p-tolyl and naphthyl; heterocyclic groups (preferably (more preferably $C_{3-30}$) substituted or non-substituted, 5-membered or 6-membered, aromatic or non-aromatic heterocyclic monovalent residues) such as 2-furyl, 2-thienyl, 2-pyrimidinyl and 2-benzothiazolyl; cyano, hydroxyl, nitro, carboxyl, alkoxys (preferably $C_{1-30}$ substituted or non-substituted alkoxys) such as methoxy, ethoxy, iso-propoxy, t-butoxy, n-octyloxy and 2-methoxyethoxy; aryloxys (preferably $C_{6-30}$ substituted or non-substituted aryloxys) such as phenoxy, 2-methylphenoxy, 4-t-butylphenoxy, 3-nitrophenoxy and 2-tetradecanoyl aminophenoxy; silyloxys (preferably $C_{3-20}$ silyloxys) such as trimethylsilyloxy and t-butyldimethylsilyloxy; hetero-cyclic-oxys (preferably $C_{2-30}$ substituted or non-substituted hetero-cyclic-oxys) such as 1-phenyltetrazole-5-oxy and 2-tetrahydropyrenyloxy; acyloxys (preferably $C_{2-30}$ substitute or non-substituted alkylcarbonyloxys and $C_{6-30}$ substituted or non-substituted arylcarbonyloxys) such as formyloxy, acetyloxy, pivaloyloxy, stearoyoxy, benzoyloxy and p-methoxyphenylcarbonyloxy; carbamoyloxys (preferably $C_{1-30}$ substituted or non-substituted carbamoyloxys) such as N,N-dimethyl carbamoyloxy, N,N-diethyl carbamoyloxy, morpholinocarbonyloxy, N,N-di-n-octylaminocarbonyloxy and N-n-octylcarbamyloxy; alkoxy carbonyloxys (preferably $C_{2-30}$ substituted or non-substituted alkoxy carbonyloxys) such as methoxy carbonyloxy, ethoxy carbonyloxy, t-butoxy carbonyloxy and n-octyloxy carbonyloxy; aryloxy carbonyloxys (preferably $C_{7-30}$ substituted or non-substituted aryloxy carbonyloxys) such as phenoxy carbonyloxy, p-methoxyphenoxy carbonyloxy and p-n-hexadecyloxyphenoxy carbonyloxy; aminos (preferably $C_{0-30}$ substituted or non-substituted alkylaminos and $C_{6-30}$ substituted or non-substituted arylaminos) such as amino, methylamino, dimethylamino, anilino, N-methyl-anilino and diphenylamino; acylaminos (preferably $C_{1-30}$ substituted or non-substituted alkylcarbonylaminos and $C_{6-30}$ substituted or non-substituted arylcarbonylaminos) such as formylamino, acetylamino, pivaloylamino, lauroylamino and benzoylamino; aminocarbonylaminos (preferably $C_{1-30}$ substituted or non-substituted aminocarbonylaminos) such as carbamoylamino, N,N-dimethylaminocarbonylamino, N,N-diethylamino carbonylamino and morpholino carbonylamino; alkoxycarbonylaminos (preferably $C_{2-30}$ substituted or non-substituted alkoxycarbonylaminos) such as methoxycarbonylamino, ethoxycarbonylamino, t-butoxycarbonylamino, n-octadecyloxycarbonylamino and N-methyl-methoxy carbonylamino; aryloxycarbonylaminos (preferably $C_{7-30}$ substituted or non-substituted aryloxycarbonylaminos) such as phenoxycarbonylamino, p-chloro phenoxycarbonylamino and m-n-octyloxy phenoxy carbonylamino; sulfamoylaminos (preferably $C_{0-30}$ substituted or non-substituted sulfamoylaminos) such as sulfamoylamino, N,N-dimethylamino sulfonylamino and N-n-octylamino sulfonylamino; alkyl- and aryl-sulfonylaminos (preferably $C_{1-30}$ substituted or non-substituted alkyl-sulfonylaminos and $C_{6-30}$ substituted or non-substituted aryl-sulfonylaminos) such as methyl-sulfonylamino, butyl-sulfonylamino, phenyl-sulfonylamino, 2,3,5-trichlorophenyl-sulfonylamino and p-methylphenyl-sulfonylamino; mercapto; alkylthios (preferably substituted or non-substituted $C_{1-30}$ alkylthios such as methylthio, ethylthio and n-hexadecylthio; arylthios (preferably $C_{6-30}$ substituted or non-substituted arylthios) such as phenylthio, p-chlorophenylthio and m-methoxyphenylthio; heterocyclic-thios (preferably $C_{2-30}$ substituted or non-substituted heterocyclic-thios such as 2-benzothiazolyl thio and 1-phenyltetrazol-5-yl-thio; sulfamoyls (preferably $C_{0-30}$ substituted or non-substituted sulfamoyls) such as N-ethylsulfamoyl, N-(3-dodecyloxypropyl)sulfamoyl, N,N-dimethylsulfamoyl, N-acetylsulfamoyl, N-benzoylsulfamoyl, N—(N'-phenylcarbamoyl)sulfamoyl; sulfo; alkyl- and aryl-sulfinyls (preferably $C_{1-30}$ substituted or non-substituted alkyl- or $C_{6-30}$ substituted or non-substituted aryl-sulfinyls) such as methylsulfinyl, ethylsulfinyl, phenylsulfinyl and p-methylphenylsulfinyl; alkyl- and aryl-sulfonyls (preferably $C_{1-30}$ substituted or non-substituted alkyl-sulfonyls and $C_{6-30}$ substituted or non-substituted arylsulfonyls) such as methylsulfonyl, ethylsulfonyl, phenylsulfonyl and p-methylphenylsulfonyl; acyls (preferably $C_{2-30}$ substituted non-substituted alkylcarbonyls, and $C_{7-30}$ substituted or non-substituted arylcarbonyls) such as formyl, acetyl and pivaloyl benzyl; aryloxycarbonyls (preferably $C_{7-30}$ substituted or non-substituted aryloxycarbonyls) such as phenoxycarbonyl, o-chlorophenoxycarbonyl, m-nitrophenoxycarbonyl and p-t-butylphenoxycarbonyl; alkoxycarbonyls (preferably $C_{2-30}$ substituted or non-substituted alkoxycarbonyls) methoxycarbonyl, ethoxycarbonyl, t-butoxycarbonyl and n-octadecyloxycarbonyl; carbamoyls (preferably $C_{1-30}$ substituted or non-substituted carbamoyls) such as carbamoyl, N-methylcarbamoyl, N,N-dimethylcarbamoyl, N,N-di-n-octylcarbamoyl and N-(methylsulfonyl)carbamoyl; aryl- and heterocyclic-azos (preferably $C_{6-30}$ substituted or non-substituted arylazos and $C_{3-30}$ substituted or non-substituted heterocyclicazos) such as phenylazo and p-chlorophenylazo, 5-ethylthio-1,3,4-thiadiazol-2-yl-azo, imides such as N-succinimide and N-phthalimide; phosphinos (preferably $C_{2-30}$ substituted or non-substituted phosphinos) such as dimethyl phosphino, diphenyl phosphino and methylphenoxy phosphino; phosphinyls (preferably $C_{2-30}$ substituted or non-substituted phosphinyls) such as phosphinyl, dioctyloxy phosphinyl and diethoxy phosphinyl; phosphinyloxys (preferably $C_{2-30}$ substituted or non-substituted phosphinyloxys) such as diphenoxyphosphinyloxy and dioctyloxyphosphinyloxy; phosphinylaminos (preferably $C_{2-30}$ substituted or non-substituted phosphinylaminos) such as dimethoxy phosphinylamino and dimethylamino phosphinylamino; and silyls (preferably $C_{3-30}$ substituted or non-substituted silyls) such as trimethylsilyl, t-butylmethylsilyl and phenyldimethylsilyl.

The substituents, which have at least one hydrogen atom, may be substituted by at least one substituent selected from these. Examples such substituent include alkylcarbonylaminosulfo, arylcarbonylaminosulfo, alkylsulfonylaminocarbonyl and arylsulfonylaminocarbonyl. More specifically, methylsulfonylaminocarbonyl, p-methylphenylsulfonylaminocarbonyl, acetylaminosulfonyl and benzoylaminosulfonyl are exemplified.

Same or different two or more substituents may be selected. If possible, the substituents may bond to each other to form a ring.

In the formula (I), n is an integer from 0 to 5, preferably from 0 to 3, more preferably 0 or 1, and most preferably 0. For the case where n is an integer of 2 or larger, a plurality of $R^2$s may be same or different.

Each of $R^3$ and $R^4$ independently represents a hydrogen atom or substituent. The substituent may be selected from Substitution Group T of. Preferably, both of $R^3$ and $R^4$ are hydrogen atoms.

In the formula (I), m is an integer equal to or larger than 0, preferably from 0 to 3, and most preferably 0 or 1.

Preferable examples of the compound represented by the formula (I) include benzyl methacrylate, benzyl acrylate, phenyl acrylate and phenyl methacrylate, among which benzyl methacrylate and phenyl methacrylate are more preferable.

Method of forming the pressure-sensitive adhesive layer is not specifically limited, wherein a general method is such as coating, and then drying, a solution containing a pressure-sensitive adhesive onto the surface, such as the surface of the optical compensation sheet. Alternatively, a method of using a transfer material, having a pressure-sensitive adhesive layer formed on the surface of a temporary support (release sheet) and transferring the pressure-sensitive adhesive layer onto a surface, typically onto the surface of the optical compensation sheet, may be adoptable.

Thickness of the pressure-sensitive adhesive layer is not specifically limited, and is preferably adjusted to the range from 10 to 40 μm on the dry basis.

To the composition, such as the coating liquid or the like to be used for forming the pressure-sensitive adhesive layer, a crosslinking agent may be added together with the pressure-sensitive adhesive. Examples of the crosslinking agent include polyisocyanate compound, polyamine compound, melamine resin, urea resin, epoxy resin and so forth. Moreover, to the above-described composition, if necessary, any publicly-known tackifier, plasticizer, filler, antioxidant, UV absorber and so forth may be added without departing from the purpose of the present invention.

«Optical Compensation Sheet»

The polarizing plate of the present invention comprises an optical compensation sheet. When the polarizing plate is incorporated into a liquid crystal display device, the optical compensation sheet is preferably disposed between the polarizer layer and the liquid crystal cell. The optical compensation sheet has the modulus of elasticity thereof satisfying the above-descried condition of value Y, in relation to the photoelastic coefficient of the pressure-sensitive adhesive layer to be combined. From the viewpoint of allowing producing of the optical compensation sheet from general materials, without extremely narrowing the range of material selection, the modulus of elasticity of the optical compensation sheet preferably falls within the range from $5 \times 10^8$ Pa to $1 \times 10^{10}$ Pa, and more preferably from $1 \times 10^9$ Pa to $5 \times 10^9$ Pa.

Although not specifically limited, the photoelastic coefficient of the optical compensation sheet is preferably adjusted to $50 \times 10^{-12}$ (1/Pa) or smaller.

Materials composing the optical compensation sheet are not specifically limited. For example, a polymer film composed of a polymer of triacetyl cellulose or norbornenes, or a stacked film comprising an optically anisotropic layer formed of a liquid crystal composition and a transparent support having the layer thereon, may be applicable. The optical compensation sheet (or the support of the optical compensation sheet if the optical sheet is the above mentioned stacked film; referred to as "optical compensation sheet and so forth", hereinafter) may be a polymer film. Polymer film having a transmittance of light of 80% or larger is preferably used. Examples of polymer composing the polymer film include cellulose esters (for example, cellulose acetate, cellulose diacetate, cellulose triacetates (triacetyl cellulose), polyolefins (for example, norbornene-base polymer), polycarbonate and polysulfon. Commercially available polymers [norbornene-base polymers such as Arton (from JSR Corporation) ZEONOR (from ZEON Corporation) and so forth] may be used.

It is preferable that the polymer film comprises mainly triacetyl cellulose or norbornene as a major ingredient. In this description, the term "major ingredient" means an ingredient which a polymer film contains in an amount equal to or more than 50 mass %. Among them, cellulose ester is particularly preferable, and lower fatty acid ester of cellulose is still more preferable. The term "lower fatty acid" herein means fatty acid having 6 or smaller number of carbon atoms. The number of carbon atoms is preferably 2 (cellulose acetate), 3 (cellulose propionate) or 4 (cellulose butyrate). Cellulose acetate is particularly preferable. Also mixed aliphatic acid ester such as cellulose acetate propionate and cellulose acetate butyrate may be used. The lower fatty acid ester of cellulose is most preferably cellulose acetate.

The degree of acetylation of cellulose acetate is preferably 55.0 to 62.5%, and more preferably 59.0 to 61.5%. The degree of acetylation herein means an amount of attached acetic acid moiety per unit mass of cellulose. The degree of acetylation may be decided according to measurement and calculation specified by ASTM D-817-91 (method of testing cellulose acetate and so forth).

Viscosity-average degree of polymerization (DP) of cellulose acetate (also referred to as acetyl cellulose) is preferably 250 or larger, and more preferably 290 or larger.

The cellulose ester (cellulose acetate) used in the present invention may preferably have a narrow range of distribution in terms of Mw/Mn (Mw represents mass-average molecular weight, and Mn represents number-average molecular weight) measured by gel permeation chromatography. More specifically, Mw/Mn preferably falls in the range from 1.0 to 1.7, more preferably from 1.3 to 1.65, and still more preferably from 1.4 to 1.6.

In general, hydroxyl groups at the 2-, 3- and 6-positions are not equally shared for ⅓ each of the total degree of distribution, wherein hydroxyl group at the 6-position tends to be less substituted. In the present invention, it is more preferable that the degree of substitution of hydroxyl groups at the 6-position is larger than that at the 2- and 3-positions. With respect to the total degree of substitution, 30% or more, more preferably 31% or more, and still more preferably 32% or more of hydroxyl groups at the 6-position are preferably substituted by acetyl groups. Moreover, the degree of substitution by the acetyl groups at the 6-position of cellulose acetate is preferably 0.88 or more. Other than those substituted by acetyl groups, also those having acyl groups having 3 or more carbon atoms, such as propionyl groups, butyloyl groups, valeroyl groups, benzoyl groups and acryloyl groups, substituting hydroxyl groups at the 6-position, may be used for producing the optical compensation sheet. The degree of substitution at the individual positions may be determined by NMR. Alternatively, cellulose acetate obtained by methods described in Japanese laid-Open Patent Publication No. H11-5851, Exemplary Synthesis 1 from paragraphs 0043 to 0044, Exemplary Synthesis 2 from paragraphs 0048 to 0049, and Exemplary Synthesis 3 from paragraphs 0051 to 0052, may be used for producing the optical compensation sheet and so forth.

(Retardation Enhancer)

For the case where the cellulose acetate film is used typically as the optical compensation sheet, an aromatic compound having at least two aromatic rings may preferably be used as a retardation enhancer, in order to adjust the retardation. The aromatic compound is preferably used in an amount ranging from 0.01 to 20 parts by mass per 100 parts by mass of cellulose acetate, more preferably from 0.05 to 15 parts by mass, and still more preferably from 0.1 to 10 parts by mass. Two or more species of aromatic compounds may be used in combination. Aromatic ring of the aromatic compound contains an aromatic heterocycle in addition to an aromatic hydrocarbon ring.

The aromatic hydrocarbon ring especially preferably contains a 6-membered ring (that is, benzene ring). The aromatic heterocycle is generally an unsaturated heterocycle. The aromatic heterocycle is preferably a 5-membered ring, 6-membered ring or 7-membered ring, and more preferably a 5-membered ring or 6-membered ring. The aromatic heterocycle generally has the possibly largest number of double bonds. As the hetero atom, nitrogen atom, oxygen atom and sulfur atom are preferable, wherein nitrogen atom is particularly preferable. Examples of the aromatic heterocycle include furan ring, thiophene ring, pyrrole ring, oxazole ring, isoxazole ring, thiazole ring, isothiazole ring, imidazole ring, pyrazole ring, furazan ring, triazole ring, pyran ring, pyridine ring, pyridazine ring, pyrimidine ring, pyrazine ring and 1,3,5-triazine ring. The aromatic ring is preferably benzene ring, furan ring, thiophene ring, pyrrole ring, oxazole ring, thiazole ring, imidazole ring, triazole ring, pyridine ring, pyrimidine ring, pyrazine ring and 1,3,5-triazine ring, and is more preferably benzene ring and 1,3,5-triazine ring. The aromatic compound is particularly preferable to have at least one 1,3,5-triazine ring.

The number of aromatic rings in the aromatic compound is preferably 2 to 20, more preferably 2 to 12, still more preferably 2 to 8, and most preferably 2 to 6. Modes of bonding between two aromatic rings may be classified into (a) forming a condensed ring, (b) direct bonding through a single bond, and (c) bonding through a linking group (spiro bonding cannot be formed by aromatic rings). The modes of bonding may be any of (a) to (c).

Examples of the condensed ring (condensed ring composed of two or more aromatic rings), (a), include indene ring, naphthalene ring, azulene ring, fluorene ring, phenanthrene ring, anthracene ring, acenaphthylene ring, naphthacene ring, pyrene ring, indole ring, isoindole ring, benzofuran ring, benzothiophene ring, indolizine ring, benzooxazole ring, benzothiazole ring, benzoimidazole ring, benzotriazole ring, purine ring, indazole ring, chromene ring, quinoline ring, isoquinoline ring, quinolizine ring, quinazoline ring, cinnnoline ring, quinoxaline ring, phthalazine ring, pteridine ring, carbazole ring, acridine ring, phenanthridine ring, xanthene ring, phenazine ring, phenothiazine ring, phenoxathiine ring, phenoxazine ring and thianthrene ring. Among these, naphthalene ring, azulene ring, indole ring, benzooxazole ring, benzothiazole ring, benzoimidazole ring, benzotriazole ring and quinoline ring are preferable.

The single bonding, (b), is preferably a bond between carbon atoms of two aromatic rings. Alternatively, two or more single bonds may be used for bonding two aromatic rings so as to form an aliphatic ring or a non-aromatic heterocycle between two aromatic rings.

The linking group, (c), is preferably bound to carbon atoms embedded in two aromatic rings respectively. The linking group is preferably an alkylene group, alkenylene group, alkynylene group, —CO—, —O—, —NH—, —S—, or any combinations thereof. Examples of the linking groups based on such combinations will be shown below. It is to be understood that the left/right directionality of the linking groups shown below may be inverted.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have substituent(s). Examples of the substituent include halogen atom (F, Cl, Br, I), hydroxyl, carboxyl, cyano, amino, nitro, sulfo, carbamoyl, sulfamoyl, ureido, alkyl group, alkenyl group, alkynyl group, aliphatic acyl group, aliphatic acyloxy group, alkoxy group, alkoxycarbonyl group, alkoxycarbonylamino group, alkylthio group, alkylsulfonyl group, aliphatic amide group, aliphatic sulfonamide group, aliphatic-substituted amino group, aliphatic-substituted carbamoyl group, aliphatic-substituted sulfamoyl group, aliphatic-substituted ureido group and non-aromatic heterocyclic group.

In this patent specification, also any atom other than hydrogen atom substituting the hydrogen atom will be referred to as substituent, for the convenience's sake.

The number of carbon atoms of the alkyl group is preferably 1 to 8. Chain-like alkyl groups are more preferable than cyclic alkyl groups, and straight-chain alkyl groups are particularly preferable. The alkyl group may further have substituent(s) (for example, hydroxy, carboxy, alkoxy group, alkyl-substituted amino group). Examples of the alkyl group (including substituted alkyl group) include methyl, ethyl, n-butyl, n-hexyl, 2-hydroxyethyl, 4-carboxybutyl, 2-methoxyethyl and 2-diethyl aminoethyl.

The number of carbon atoms of the -alkenyl group may preferably be 2 to 8. Chain-like alkenyl groups are more preferable than cyclic alkenyl groups, and straight-chain alkenyl groups are particularly preferable. The alkenyl group may further have substituent(s). Examples of the alkenyl group include vinyl, allyl and 1-hexenyl. The number of carbon atoms of the alkynyl group is preferably 2 to 8. Chain-like alkynyl groups are more preferable than cyclic alkynyl groups, and straight-chain alkynyl groups are particularly preferable. The alkynyl group may further have substituent(s). Examples of the alkynyl group include ethynyl, 1-butynyl and 1-hexynyl groups.

The number of carbon atoms of the aliphatic acyl group may preferably be 1 to 10. Examples of the aliphatic acyl group include acetyl, propanoyl and butanoyl groups.

The number of carbon atoms of the aliphatic acyloxy group may preferably be 1 to 10. Examples of the aliphatic acyloxy group include acetoxy group.

The number of carbon atoms of the alkoxy group may preferably be 1 to 8. The alkoxy group may further have substitutent(s) (for example, alkoxy group). Examples of the alkoxy group (including alkoxy group) include methoxy, ethoxy, butoxy and methoxyethoxy groups.

The number of carbon atoms of the alkoxycarbonyl group may preferably be 2 to 10. Examples of the alkoxycarbonyl group include methoxycarbonyl and ethoxy carbonyl groups.

The number of carbon atoms of the alkoxycarbonylamino group may preferably be 2 to 10. Examples of the alkoxycarbonylamino group include methoxycarbonylamino and ethoxycarbonylamino groups.

The number of carbon atoms of the alkylthio group may preferably be 1 to 12. Examples of the alkylthio group include methylthio, ethylthio and actyloctylthio groups.

The number of carbon atoms of the alkylsulfonyl group may preferably be 1 to 8. Examples of the alkylsulfonyl group include methanesulfonyl and ethanesulfonyl groups.

The number of carbon atoms of the aliphatic amide group may preferably be 1 to 10. Examples of the aliphatic amide group include acetamide group.

The number of carbon atoms of the aliphatic sulfonamide group may preferably be 1 to 8. Examples of the aliphatic sulfonamide group include methane sulfonamide, butane sulfonamide and n-octane sulfonamide groups.

The number of carbon atoms of the aliphatic-substituted amino group may preferably be 1 to 10. Examples of the aliphatic-substituted amino group include dimethylamino, diethylamino and 2-carboxyethylamino groups.

The number of carbon atoms of the aliphatic-substituted carbamoyl group may preferably be 2 to 10. Examples of the aliphatic-substituted carbamoyl group include methyl carbamoyl and diethyl carbamoyl groups.

The number of carbon atoms of the aliphatic-substituted sulfamoyl group may preferably be 1 to 8. Examples of the aliphatic-substituted sulfamoyl group include methyl sulfamoyl and diethyl sulfamoyl groups.

The number of carbon atoms of aliphatic substituted ureido group is preferably from 2 to 10. Examples of the aliphatic substituted ureido group include methyl ureido group.

Examples of non-aromatic heterocyclic group include piperidino group and morpholino group.

Molecular weight of the retardation enhancer is preferably 300 to 800. Specific examples of the retardation enhancer include the compounds described in Japanese Laid-Open Patent Publication Nos. 2000-111914 and 2000-275434, and International Patent WO00/065384 Pamphlet.

(Preparation of Cellulose Acetate Film)

A method of producing cellulose acetate film will be explained. The method and facility for producing the cellulose acetate film may be publicly-known methods and apparatuses of forming the film by solvent spreading.

Among these, the cellulose acetate film may be produced preferably by the solvent cast process. In the solvent cast process, the film is produced using a solution (dope) having cellulose acetate dissolved in an organic solvent. The organic solvent preferably contains ether having 3 to 12 carbon atoms, ketone having 3 to 12 carbon atoms, ester having 3 to 12 carbon atoms, or halogenated hydrocarbon having 1 to 6 carbon atoms. The ether, ketone and ester may have cyclic structures. Any compounds having two or more functional groups of these ether, ketone and ester (that is, —O—, —CO— and —COO—) may be adoptable as the organic solvent. The organic solvent may have also other functional groups such as alcoholic hydroxyl group. As for any organic solvents, having two or more species of functional group, it is good enough that the number of carbon atoms falls in any specified range of compounds having any of these functional groups.

Examples of the ether having 3 to 12 carbon atoms include diisopropyl ether, dimethoxymethane, dimethoxyethane, 1,4-dioxane, 1,3-dioxolane, tetrahydrofuran, anisole and phenetol.

Examples of the ketone having 3 to 12 carbon atoms include acetone, methyl ethyl ketone, diethyl ketone, diisobutylketone, cyclohexanone and methyl cyclohexanone.

Examples of the ester having 3 to 12 carbon atoms include ethyl formate, propyl formate, pentyl formate, methyl acetate, ethyl acetate and pentyl acetate.

Examples of the organic solvent having two species of more functional group include 2-ethoxyethyl acetate, 2-methoxy ethanol and 2-butoxy ethanol.

The number of carbon atoms of the halogenated hydrocarbon is preferably 1 or 2, and most preferably 1. Halogen in the halogenated hydrocarbon is preferably chlorine. For the case where the hydrogen atoms of the halogenated hydrocarbon are substituted by halogen, a ratio of substitution by halogen preferably falls in the range from 25 to 75 mol %, more preferably from 30 to 70 mol %, still more preferably from 35 to 65 mol %, and most preferably from 40 to 60 mol %. Methylene chloride is a representative halogenated hydrocarbon.

Two or more species of organic solvents may be used in a mixed manner.

The cellulose acetate solution may be prepared by any general method. The general method herein means treatment at a temperature of 0° C. or above (normal temperature or higher temperatures). Preparation of the solution may be carried out by adopting methods and apparatuses for preparing dope in general solvent cast process. In the general method, halogenated hydrocarbon (in particular methylene chloride) may preferably used as the organic solvent. Amount of cellulose acetate is preferably adjusted as being contained to as much as 10 to 40% by mass, and more preferably 10 to 30% by mass, in the resultant cellulose acetate solution. The organic solvent (main solvent) may be added with arbitrary additives described later. The solution may be prepared by stirring cellulose acetate and an organic solvent at normal temperature (0 to 40° C.). A high concentration solution may be stirred under pressure or heating conditions. More specifically, cellulose acetate and an organic solvent are placed in a pressure vessel, the vessel is tightly closed, and the mixture is stirred under pressure while being heated to a range of temperature not lower than the boiling point under normal pressure of the solvent, so as to keep the solvent unboiled. The heating temperature is normally 40° C. or above, preferably 60 to 200° C., and more preferably 80 to 110° C.

The individual components may be placed in the vessel as being preliminarily mixed. Alternatively, they may be placed into the vessel sequentially. The vessel is preferably composed so as to allow stirring. The vessel may be pressurized as being injected by an inert gas such as nitrogen gas. Alternatively, elevation of vapor pressure under heating may be available. Still alternatively, the vessel is tightly closed, and then added with the individual components under pressure. Heating is preferably given from the external of the vessel. For example, a jacket-type heating apparatus may be adoptable. Alternatively, a plate heater may be placed outside the vessel, a piping may be attached thereto, and a liquid medium may be allowed to circulate therethrough so as to heat the entire vessel. Stirring is preferably effected by using a stirring propeller provided inside the vessel. The stirring propeller is preferably as long as reaching close to the vessel wall. The stirring propeller is preferably provided with a scraper blade for refreshing liquid film formed on the vessel wall. The vessel may be provided also with measurement instruments such as a pressure gauge, thermometer and so forth. The individual components may be dissolved into the solvent within the vessel. The prepared dope may be taken out from the vessel after being cooled, or may be cooled using a heat exchanger or the like after being taken out.

The solution may be prepared also by the cooled solubilization method. By the cooled solubilization method, cellulose acetate may be solubilized also into an organic solvent into which cellulose acetete cannot readily be dissolved by general methods of dissolution. The cooled solubilization method is preferable also for solvents allowing cellulose acetate to dissolve therein by the general methods, because a homogeneous solution may rapidly be obtained. In the cooled solubilization method, first, cellulose acetate is gradually added to an organic solvent under stirring at room temperature. The amount of cellulose acetate is preferably adjusted to 10 to 40% by mass of the mixture. The amount of cellulose acetate is more preferably adjusted to 10 to 30% by mass. Alternatively, the mixture may further be added with arbitrary additives described later.

Next, the mixture is cooled to −100 to −10° C. (preferably −80 to −10° C., more preferably −50 to −20° C., and most preferably −50 to −30° C.). The cooling may be carried out typically in a diethylene glycol solution (−30 to −20° C.) cooled on a dry ice-methanol bath (−75° C.). Under such cooling, a mixture of cellulose acetate and the organic solvent solidifies. Rate of cooling is preferably 4° C./min or faster, more preferably 8° C./min or faster, and most preferably 12° C./min or faster. Faster rate of cooling is more preferable, wherein theoretical upper limit may be 10000° C./sec, technical upper limit may be 1000° C./sec, and practical upper limit may be 100° C./sec. The rate of cooling herein is a value obtained by dividing difference between the temperature at the start of cooling and the temperature finally reached by the cooling, by length of time ranging from the start of cooling up to when the final temperature of cooling is reached.

When the solidified mixture is heated to 0 to 200° C. (preferably 0 to 150° C., more preferably 0 to 120° C., and most preferably 0 to 50° C.), cellulose acetate dissolves into the organic solvent. Such elevation of temperature may be effected by merely allowing the mixture to stand at room temperature, or by heating on a warm bath. Rate of heating is preferably 4° C./min or faster, more preferably 8° C./min or faster, and most preferably 12° C./min or faster. Faster rate of heating is more preferable, wherein theoretical upper limit may be 10000° C./sec, technical upper limit may be 1000° C./sec, and practical upper limit may be 100° C./sec. The rate of heating herein is a value obtained by dividing difference between the temperature at the start of heating and the temperature finally reached by the heating, by length of time ranging from the start of heating up to when the final temperature of heating is reached. A homogeneous solution may be obtained in this way. Operations of cooling and heating may be repeated if the dissolution is insufficient. Whether the dissolution is sufficient or not may be judged by visual observation of appearance of the solution.

In the cooled solubilization method, a sealable vessel is preferably used in order to avoid contamination by moisture due to dewing in the process of cooling. In the process of cooling and heating, pressurizing in the process of cooling and reducing pressure in the process of heating may shorten the time for solubilization. A pressure-proof vessel is preferably used so as to allow pressurizing and reduction in pressure.

For example, a 20%-by-mass solution of cellulose acetate having a degree of acetylation of 60.9% and a viscosity-average degree of polymerization of 299, dissolved in methyl acetate by the cooled solubilization method was found to have a quasi-phase transition point between sol state and gel state at around 33° C., when measured by differential scanning calorimetry (DSC), showing a uniform gel state at and below the temperature. It is therefore necessary to keep this solution at or above the quasi-phase transition point, and preferably at a temperature approximately 10° C. higher than a gel phase transition temperature. It is, however, to be noted that the quasi-phase transition temperature may vary depending on the degree of acetylation and viscosity-average degree of polymerization of cellulose acetate, concentration of the solution, and organic solvent to be adopted.

As described previously, the cellulose acetate film is preferably produced from the prepared cellulose acetate solution (dope) by the solvent cast method. For the purpose of producing the cellulose acetate film used as the support of the optical compensation sheet, the dope is preferably added with the above-described retardation enhancer. The dope is cast on a drum or band, from which the solvent is vaporized off to thereby form the film. The dope before being cast is preferably adjusted in the concentration thereof so that the solid content falls in the range from 18 to 35%. Surfaces of the drum and the band are preferably finished to a mirror-like state. Methods of casting and drying in the solvent cast method are described in patent specifications of U.S. Pat. Nos. 2,336,310, 2,367,603, 2,492,078, 2,492,977, 2,492,978, 2,607,704, 2,739,069 and 2739070, British Patent Nos. 640731 and 736892, Examined Japanese Patent Publication Nos. S45-4554 and S49-5614, Japanese Laid-Open Patent Publication Nos. S60-176834, S60-203430 and S62-115035. The dope is preferably cast on the drum or the band having a surface temperature of 10° C. or lower. The cast solution is preferably dried under air blow for 2 seconds or longer after the casting. Alternatively, the obtained film may be separated from the drum or the band, and the residual solvent may be vaporized by drying under hot air blow, while sequentially varying the temperature thereof from 100 to 160° C. This method is described in Examined Japanese Patent Publication No. H5-17844, by which the length of time from casting to separation may desirably be shortened. In order to carry out this method, the dope may necessarily be gellated at the surface temperature of the drum and the band in the process of casting.

The casting may be carried out so as to form two layers using thus-prepared cellulose acetate solution (dope), and make them into a film. In this case, the cellulose acetate film may preferably be produced by the solvent cast process. The dope is cast onto the drum or the band, from which the solvent is vaporized off to thereby form the film. The dope before being cast is preferably adjusted in the concentration thereof so that the solid content falls in the range from 10 to 40%. Surfaces of the drum and the band are preferably finished to a mirror-like state.

For the case where two or more layers of cellulose acetate solution are cast, a plurality of cellulose acetate solutions may be cast, wherein the film may be produced by stacking the solutions containing cellulose acetate, cast respectively from a plurality of casting ports provided at intervals in the direction of feeding of the support. The methods typically described in Japanese Laid-Open Patent Publication Nos. S61-158414, H1-122419, and H11-198285 may be applicable. Alternatively, the film may be produced also by casting the cellulose acetate solutions from two casting ports. The methods typically described in Examined Japanese Patent Publication No. 60-27562, Japanese Laid-Open Patent Publication Nos. S61-94724, S61-947245, S61-104813, S61-158413, and H6-134933 may be applicable. Alternatively, a method of forming a cellulose acetate film by casting, described in Japanese Laid-Open Patent Publication No. S56-162617, by which flow of a high-viscosity cellulose acetate solution is wrapped by a low-viscosity cellulose acetate solution, and the high- and low-viscosity cellulose acetate solutions are extruded at the same time.

Alternatively, the film may be produced also by using two casting ports, wherein a film formed on a support using a first casting port is separated off, and a second casting is carried out on the surface of the film, which had been brought into contact with the surface of support. For example, a method described in Examined Japanese Patent Publication No. S44-20235 may be exemplified. The cellulose acetate solutions to be cast may be same or different. In order to give functions to a plurality of cellulose acetate layers, the cellulose acetate solutions correspondent to the functions may be cast from the individual casting ports. The cellulose acetate solutions may also be cast together with other functional layers (for example, adhesive layer, dye layer, antistatic layer, anti-halation layer, ultraviolet absorbing layer, and polarizer layer).

In the conventional single-layer liquid process, it has been necessary to extrude a high-concentration, high-viscosity cellulose acetate solution in order to achieve a necessary thickness of the film. However, this process has often suffered from a problem of causing granulation failure and flatness failure, due to poor stability of the cellulose acetate solution such as producing solid matters. As a solving means for this problem, a plurality of cellulose acetate solutions may be cast from the casting ports, and thereby not only high-viscosity solutions may be extruded onto the support at the same time, and the flatness may consequently be improved so as to produce a film having a good surface condition, but also the drying load may be reduced by virtue of use of dense cellulose acetate solutions, and thereby the production speed of the film may be improved.

(Additives)

The cellulose acetate film is preferably added with polyester urethane, aiming at improving the mechanical properties. Alternatively, polyester urethane is preferably a reaction product of polyester diol expressed by the formula (1) below and diisocyanate, and is preferably soluble to dichloromethane.

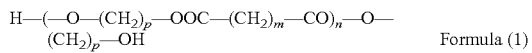

Formula (1)

In the formula (1), p represents an integer from 2 to 4; m represents an integer from 2 to 4; and n represents an integer from 1 to 100.

For more details, the constituent polyester is such as having ethylene glycol, 1,3-propane diol, or 1,4-butane diol as the glycol component, and having succinic acid, glutaric acid, or adipic acid as the dibasic acid component, thereby having hydroxyl groups on both ends thereof, and the degree of polymerization n falls in the range from 1 to 100. Optimum degree of polymerization thereof may slightly vary depending on the species of glycol and dibasic acid to be adopted, and the molecular weight particularly preferably falls in the range from 1000 to 4500.

The polyester urethane resin soluble to dichloromethane is a compound obtained by reaction between the polyester expressed by the formula (1) and a diisocyanate, and has a repeating unit expressed by the formula (2) below.

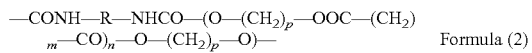

Formula (2)

In the formula (2), p represents an integer from 2 to 4; m represents an integer from 2 to 4; n represents an integer from 1 to 100; and R represents a divalent atomic group residue. Examples of the divalent atomic group residue include the followings.

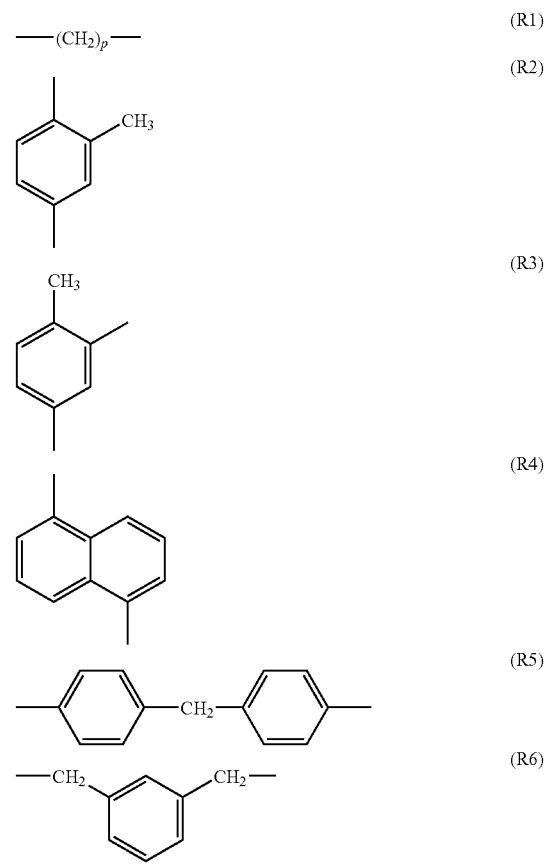

Examples of the diisocyanate component used for polyurethane compound include polymethylene diisocyanates [formula: $OCN(CH_2)_p NCO$ (p represents an integer from 2 to 8)] represented by ethylene diisocyanate, trimethylene diisocyanate, tetramethylene diisocyanate, hexamethylene diisocyanate and so forth; aromatic diisocyanates represented by p-phenylene diisocyanate, tolylene diisocyanate, p,p'-diphenylmethane diisocyanate, 1,5-naphthylene diisocyanate and the like; and m-xylylene diisocyanate, but are not limited thereto. Among these, tolylene diisocyanate, m-xylylene diisocyanate and tetramethylene diisocyanate are preferable by virtue of their readiness in availability, relatively high stability, consequent readiness in handlability, and excellence in compatibility with cellulose acetate when incorporated into polyurethane.

Molecular weight of polyester urethane resin preferably falls in the range from 2,000 to 50,000, and may appropriately be selected depending on species and molecular weight of the constitutive polyesters or the diisocyanate component coupling them. The molecular weight of the polyester urethane resin may more preferably fall in the range from 5,000 to 15,000, in view of improving mechanical characteristics of the cellulose acetate film and compatibility to cellulose acetate. The dichloromethane-soluble polyester urethane may readily be synthesized by mixing the polyester diol expressed by the formula (1) and a diisocyanate, and stirring the mixture under heating. The polyester diol represented by the formula (1) may readily be synthesized by any of polyester-forming reaction of a correspondent dibasic acid or alkyl esters thereof with glycols, or thermal fusion condensation based on an ester exchange reaction, or interfacial condensation of acid chlorides of these acids with glycols, so as to leave hydroxyl groups as the terminal groups.

The dichloromethane-soluble polyester urethane resin used in the present invention is excellent in compatibility with cellulose acetate having a degree of acetylation of 58% or larger. Although slight differences ascribable to resin structure may be observed, the polyester urethane may be soluble to as much as 200 parts by mass into 100 parts by mass of acetate, if the molecular weight of the polyester urethane is 10,000 or smaller.

Accordingly, for the purpose of improving mechanical characteristics of the film by mixing the polyester urethane resin into cellulose acetate, content of the polyester urethane resin may appropriately be determined depending on species and molecular weight of the urethane resin, and desired mechanical characteristics. If it is desired to improve the mechanical characteristics while keeping characteristics of cellulose acetate unchanged, the polyester urethane resin is preferably added up to 10 to 50% by mass to cellulose acetate. The polyester urethane resin is stable, and will not decompose up to a temperature as high as at least 180° C. The dichloromethane-soluble polyester urethanes are excellent in compatibility with cellulose acetate in particular having a degree of acetylation of 58% or larger. Therefore, by mixed use of the both, a film having an extremely large transparency may be obtained. Moreover, these polyester urethanes have large mean molecular weight, and show almost no volatility even under high temperatures, unlike the conventional low-molecular-weight plasticizers. Therefore, the film obtained by using the mixture may be less causative of nonconformities ascribable to vaporization or migration of plasticizer, having been observed for the conventional plasticizers, in the later processes.

Addition of the polyester urethane to the cellulose acetate film is preferable, in view of improving anti-folding strength and tearing strength under high and low temperatures, and making the film less tearable.

Conventionally, low-molecular-weight plasticizers have been used for improving the anti-folding strength and tearing strength of the film. These methods may be effective to some degree under normal temperature with high humidity, but the film reduces the flexibility under low temperatures with high humidity, and the results were not always satisfactory. Moreover, most attempts to improve the mechanical characteristics with the aid of the low-molecular-weight plasticizers generally resulted in considerable degradation in the mechanical characteristics such as tensile strength as the amount of addition of plasticizer increased. In contrast, when the dichloromethane-soluble polyester urethane resin was added to cellulose acetate, the resultant film was apparently lower in the degree of degradation of the strength as compared with that observed for the case where the low-molecular-weight plasticizer was added, and was found to have a large anti-folding strength almost comparable to that obtained without adding the resin, although slight degradation in the tensile strength was observed as the amount of addition of the resin increased.

Moreover, mixing of the polyester urethane may prevent migration of the plasticizer under low temperatures with high humidity. The films may therefore be transparent and glossy, not adhesive to each other, excellent in flexibility, and unlikely to cause wrinkling or creaking.

In place of, or in combination with the above-described polyester urethane, the cellulose acetate film may be added with the plasticizers below, in order to improve the mechanical characteristics.

Phosphate ester or carboxylate ester may be used as the plasticizer. Examples of the phosphate ester include triphenyl phosphate (TPP) and tricresyl phosphate (TCP). Representatives of the carboxylate ester include phthalate ester and citrate ester. Examples of the phthalate ester include dimethyl phthalate (DMP), diethyl phthalate (DEP), dibutyl phthalate (DBP), dioctyl phthalate (DOP), diphenyl phthalate (DPP) and diethyl hexyl phthalate (DEHP). Examples of the citrate ester include triethyl O-acetylcitrate (OACTE) and tributyl O-acetylcitrate (OACTB). Examples of other carboxylate esters include butyl oleate, methyl acetyl ricinolate, dibutyl sebacate, and various trimeritate esters. The phthalate ester-base plasticizers (DMP, DEP, DBP, DOP, DPP, DEHP) are preferably used. DEP and DPP are particularly preferable. Amount of addition of the plasticizer may preferably be 0.1 to 25% by mass of cellulose ester, more preferably 1 to 20% by mass, and most preferably 3 to 15% by mass.

The cellulose acetate film may be added with anti-degrading agents (for example, antioxidant, peroxide decomposing agent, radical inhibitor, metal inactivator, acid trapping agent, amine). The anti-degrading agents are described in Japanese Laid-Open Patent Publication Nos. H3-199201, H5-1907073, H5-194789, H5-271471, and H6-107854. Amount of addition of the anti-degrading agents may preferably be 0.01 to 1% by mass, and more preferably 0.01 to 0.2% by mass, of the solution (dope) to be prepared. The amount of addition less than 0.01% by mass may give almost no effect of the anti-degrading agents. The amount of addition exceeding 1% by mass may result in bleeding out of the anti-degrading agents onto the surface of the film. Especially preferable examples of the anti-degrading agents include butylated hydroxytoluene (BHT) and tribenzylamine (TBA).

(Biaxial Stretching)

The cellulose acetate film may preferably be stretched in order to reduce the virtual distortion. Because the virtual distortion may be reduced by stretching in the direction of stretching, biaxial stretching is more preferably carried out for reducing distortion in almost all in-plane directions. The biaxial stretching includes simultaneous biaxial stretching and sequential biaxial stretching, wherein the sequential biaxial stretching is preferable in view of consecutive production, by which the dope is cast, the resultant film is separated off from the band or the drum, stretched in the width-wise direction (or longitudinal direction), and then stretched in the longitudinal direction (or width-wise direction). Methods of stretching in the width-wise direction are described for example in Japanese Laid-Open Patent Publication Nos. S62-115035, H4-152125, H4-284211, H4-298310 and H11-48271.

Stretching of the film is carried out under normal temperature or under heating conditions. Temperature of heating may be not higher than the glass transition temperature of the film. The film may be stretched in the process of drying, and may be particularly effective if the solvent remains therein. In the longitudinal stretching, the film may be stretched typically by regulating the speed of feed rollers, so as to adjust the speed of winding-up of the film faster than the speed of separation of the film. In the width-wise stretching, the film may be stretched also by gradually expanding the tenter in the width-wise direction. The film may be stretched using a stretching machine (preferably by mono-axial stretching using a long stretching machine) after being dried. The factor of stretching of the film (ratio of increment in the length after stretching with respect to the original length) may preferably fall in the range from 5 to 50%, more preferably from 10 to 40%, and most preferably from 15 to 35%.

Process steps from the casting up to the post-drying may be carried out under air atmosphere, or under atmosphere of inert gas such as nitrogen gas. A winding machine used for producing the cellulose acetate film used for the present invention may be any of those generally used in the art, wherein the winding may be proceeded based on constant-tension process, constant-torque process, tapered tension process, programmed tension control process while keeping internal stress constant, and so forth.

(Surface Treatment of Cellulose Acetate Film)

The cellulose acetate film may preferably be subjected to surface treatment. Specific methods may be exemplified by corona discharge treatment, glow discharge treatment, flame treatment, acid treatment, alkali treatment, and ultraviolet irradiation. As described in Japanese Laid-Open Patent Publication No. H7-333433, also an undercoated layer may preferably be provided. In view of keeping flatness of the film, temperature of the cellulose acetate film during these processes may preferably be adjusted to Tg (glass transition temperature) or below, and more specifically 150° C. or below.

For the case where the cellulose acetate film is used as a transparent protective film of the polarizing plate, it is particularly preferable to subject the film to acid treatment or alkali treatment, or saponification of cellulose acetate, from the viewpoint of adhesiveness with the polarizer film. The surface energy may preferably be 55 mN/m or larger, and more preferably 60 mN/m or larger and 75 mN/m or smaller.

The surface treatment will be described in details below, referring to alkali saponification. The alkali saponification treatment of the cellulose acetate film may preferably be carried out according to a cycle in which the film is immersed into an alkali solution, neutralized with an acidic solution, washed with water, and then dried. Examples of the alkali solution include potassium hydroxide solution and sodium hydroxide solution, wherein normality of hydroxyl ion preferably falls in the range from 0.1 to 3.0 mol/L, and more preferably from 0.5 to 2.0 mol/L. Temperature of the alkali solution may preferably fall within the range from room temperature to 90° C., and more preferably from 40 to 70° C.

Surface energy of solid may be determined by contact angle method, wet heating method, and absorption method, as described in "Nure no Kiso to O-yo (Basics and Applications of Wetting)" (published on Dec. 10, 1989 by Realize). The contact angle method may preferably be applicable to the cellulose acetate film in the present invention. More specifically, two solutions having known values of surface energy are dropped on the cellulose acetate film, wherein the contact angle is defined, at an intersection of the surface of the droplet and the surface of the film, as one of angles formed between a tangential line drawn to the droplet and the surface of the film, and containing the droplet, and the surface energy of the film may be estimated by calculation.

Thickness of the support may preferably be adjusted to 10 to 200 μm, and more preferably to 20 to 150 μm.

As has been described in the above, the optical compensation sheet may be a stacked film produced by forming an optically anisotropic film formed of a liquid crystal composition containing a liquid crystalline compound, on a support of a polymer film. Alternatively, an alignment film may be formed on the support, and the optically anisotropic film may be formed on the alignment film. Namely, the term "on the support" or the like in this description means not only formation directly on the surface of the support or the like, but also formation on the surface of another layer such as an alignment film disposed on the support.

(Optically Anisotropic Film)

The optically anisotropic film is formed on a polymer film, which is the support, directly or while placing some other layer(s) such as an alignment film in between. The optically anisotropic film may preferably be formed using a curable composition containing at least one species of polymerizable liquid crystalline compound. For example, the optically anisotropic film may be formed by applying a coating liquid containing a liquid crystalline compound and an optionally-added polymerization initiator or other arbitrary components, to a surface of an alignment film, to thereby establish a desired state of alignment, and then by allowing a polymerization reaction to proceed so as to fix molecules of the liquid crystalline compound to such state of alignment.

Organic solvent is preferably used for the solvent for preparing the coating liquid. Examples of the organic solvent include amides (for example, N,N-dimethylformamide), sulfoxides (for example, dimethyl sulfoxide), heterocyclic compounds (for example, pyridine), hydrocarbons (for example, benzene, hexane), alkyl halides (for example, chloroform, dichloromethane, tetrachloroethane), esters (for example, methyl acetate, butyl acetate), ketones (for example, acetone, methyl ethyl ketone), and ethers (for example, tetrahydrofuran, 1,2-dimethoxyethane). Among these, alkyl halides and ketones are preferable. Two or more species of organic solvents may be used in combination. The coating liquid may be coated by any publicly-known techniques (for example, wire bar coating, extrusion coating, direct gravure coating, reverse gravure coating, die coating).

Thickness of the optically anisotropic film may preferably be adjusted to 0.1 to 20 μm, more preferably to 0.5 to 15 μm, and still more preferably to 1 to 10 μm.

The liquid crystalline compound may be either of rod-like liquid crystalline compound and discotic liquid crystalline compound. Use of the discotic liquid crystalline compound is particularly preferable.

(Rod-Like Liquid Crystalline Compound)

Examples of the rod-like liquid crystalline compound include azomethynes, azoxys, cyanobiphenyls, cyanophenyl esters, benzoate esters, cyclohexanecarboxylate phenyl esters, cyanophenyl cyclohexanes, cyano-substituted phenylpyrimidines, alkoxy-substituted phenyl pyrimidines, phenyl dioxanes, tolanes and alkenylcyclohexyl benzonitriles. Also metal complexes are included in the rod-like liquid crystalline compound.

The rod-like liquid crystalline compound are described in "Kikan, Kagaku Sosetsu, Dai 22 Kan, Ekisho no Kagaku (Quarterly, Chemical Review, Vol. 22, The Chemistry of Liquid Crystal)", edited by The Chemical Society of Japan, Chapters 4, 7 and 11, and "Ekisho Debaisu Handobukku (The Handbook of Liquid Crystal Devices)", edited by the 142nd Committee of Japan Society for the Promotion of Science, Chapter 3. Birefringent index of the rod-like liquid crystalline compound may preferably fall in the range from 0.001 to 0.7. In order to fix the state of alignment, the rod-like liquid crystalline compound necessarily has a polymerizable group. Examples of the polymerizable group (Q) are shown below.

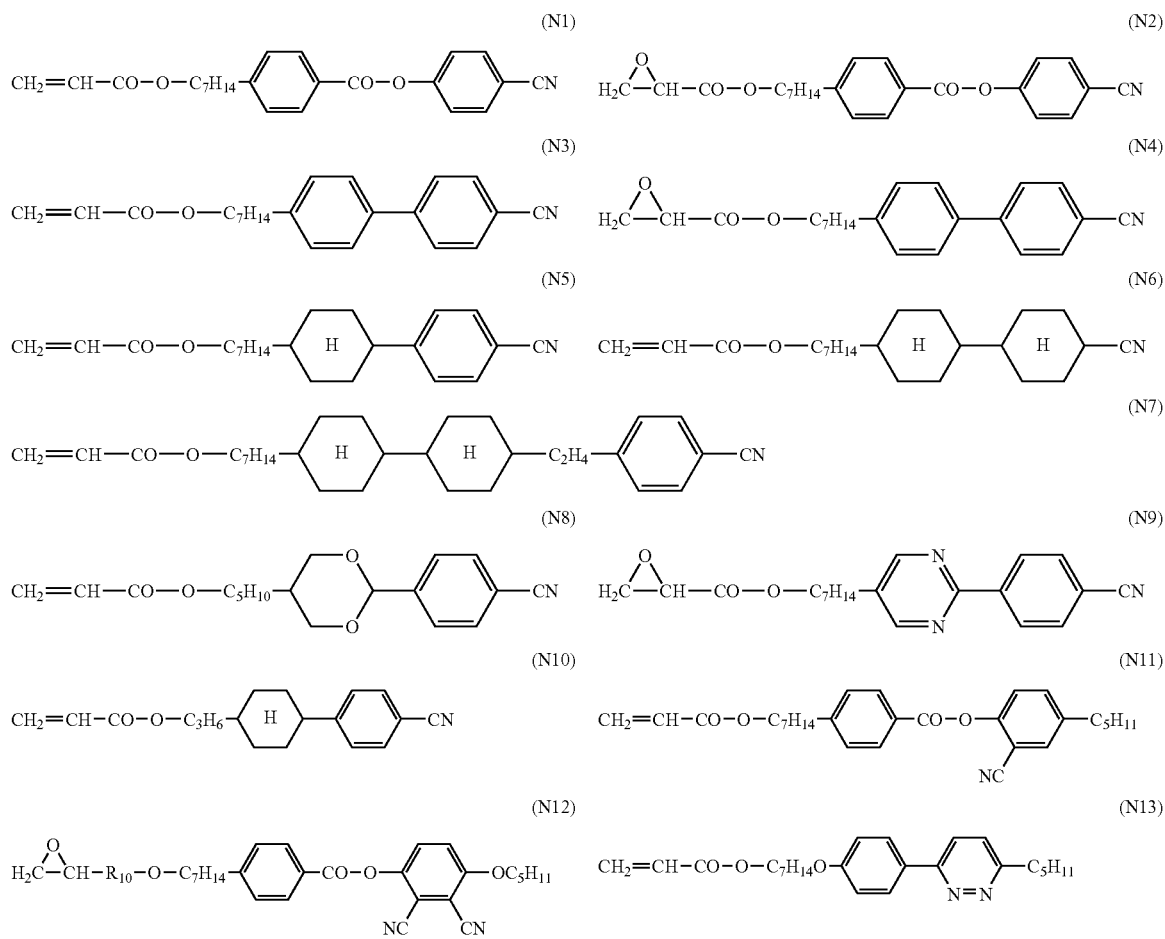

The polymerizable group (Q) is preferably unsaturated polymerizable groups (Q1 to Q7), epoxy group (Q8) or aziridinyl group (Q9), more preferably unsaturated polymerizable groups, and most preferably ethylene-base unsaturated polymerizable groups (Q1 to Q6). The rod-like liquid crystalline compound preferably has a molecular structure nearly symmetrical about the direction of short axis. In order to achieve such symmetry, the liquid crystalline compound preferably has a polymerizable group at each of both ends of the rod-like molecular structure. Examples of the rod-like liquid crystalline compound will be shown below.

-continued
(N14) 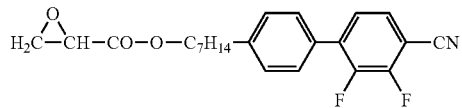
(N15) 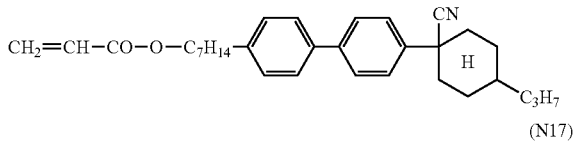
(N16) 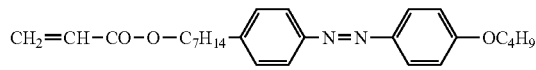
(N17) 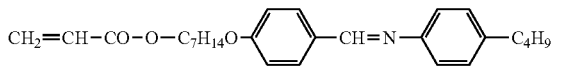
(N18) 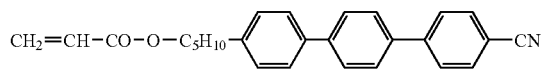
(N19) 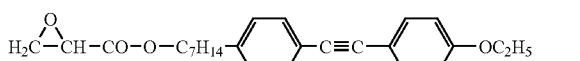
(N20) 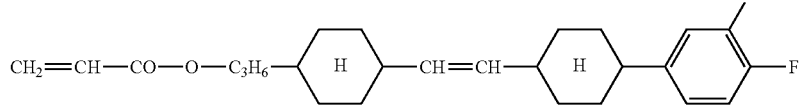
(N21) 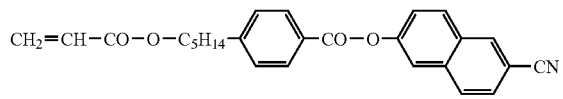
(N22) 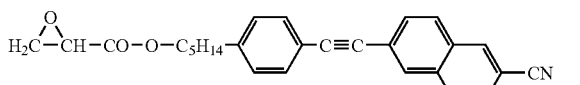
(N23) 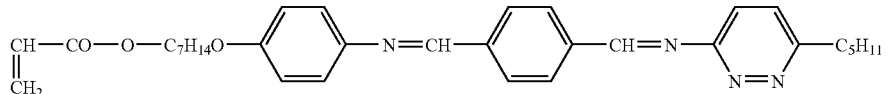
(N24) 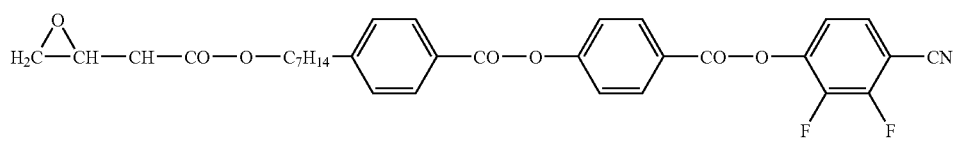
(N25) 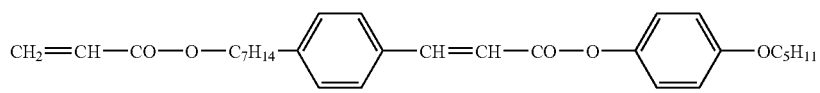
(N26) 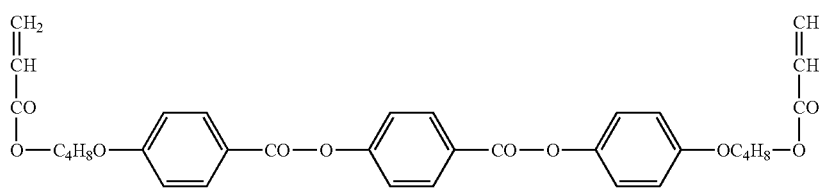
(N27) 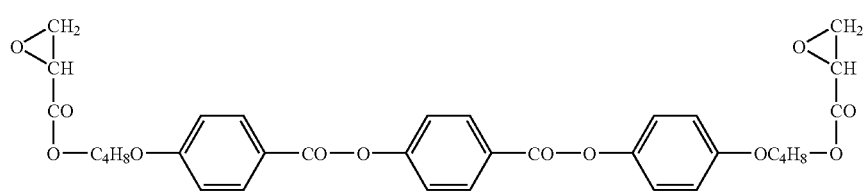
(N28) 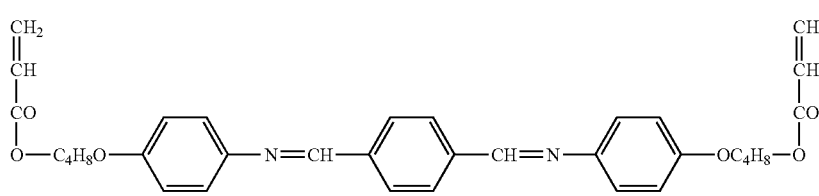

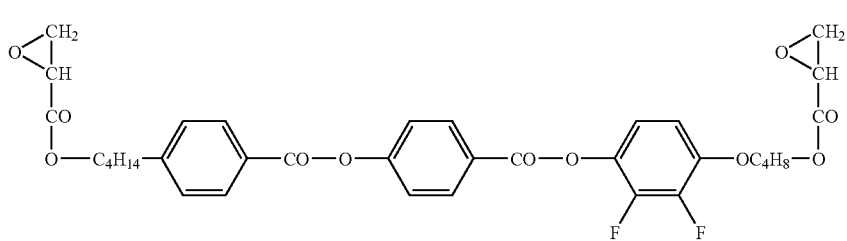 (N29)
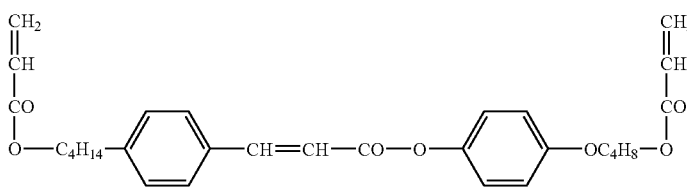 (N30)
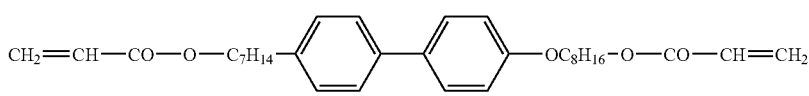 (N31)
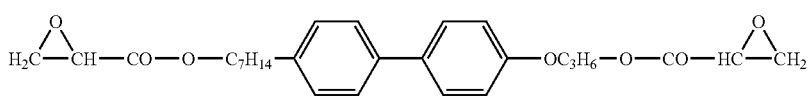 (N32)
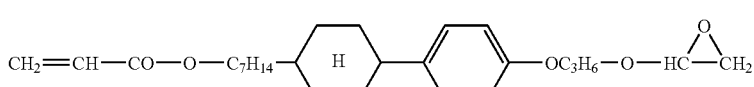 (N33)
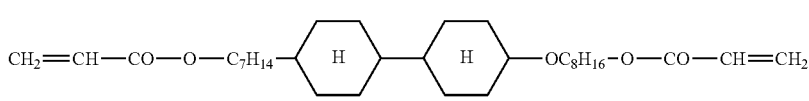 (N34)
 (N35)
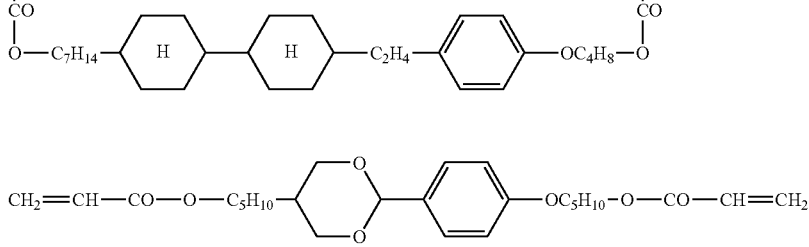 (N36)
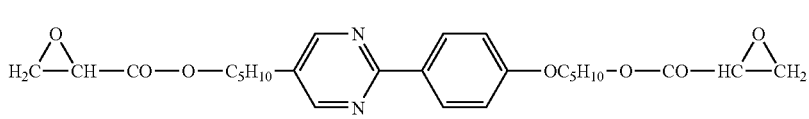 (N37)
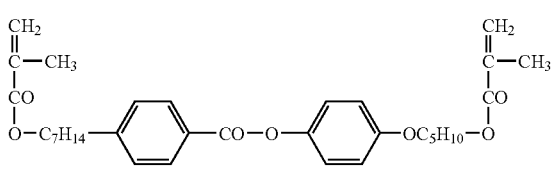 (N38)
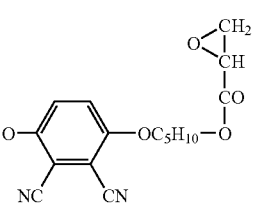 (N39)

-continued
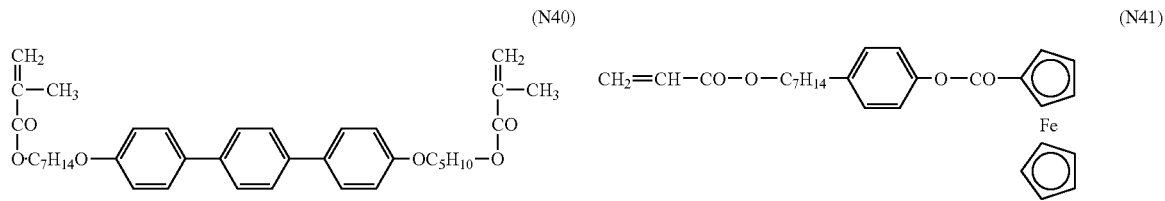
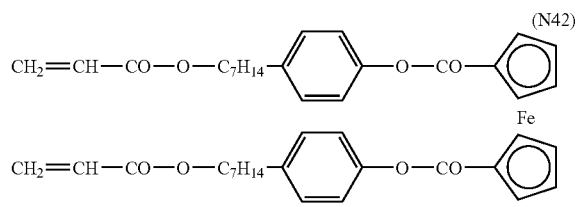
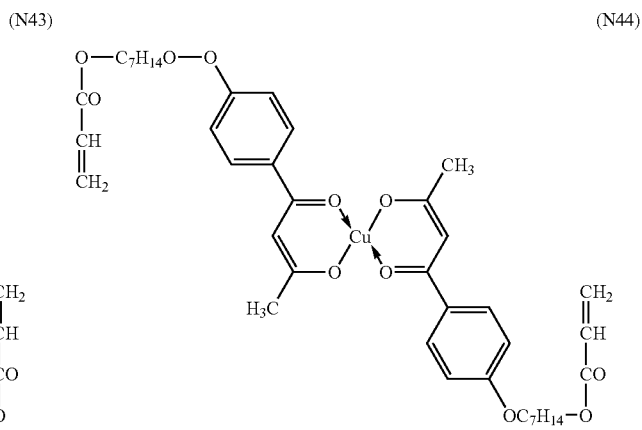
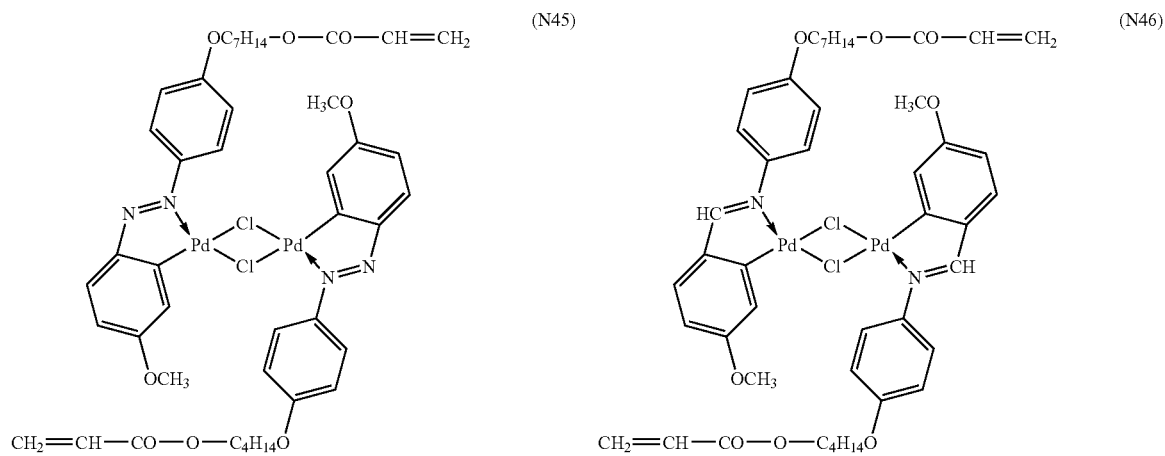

-continued

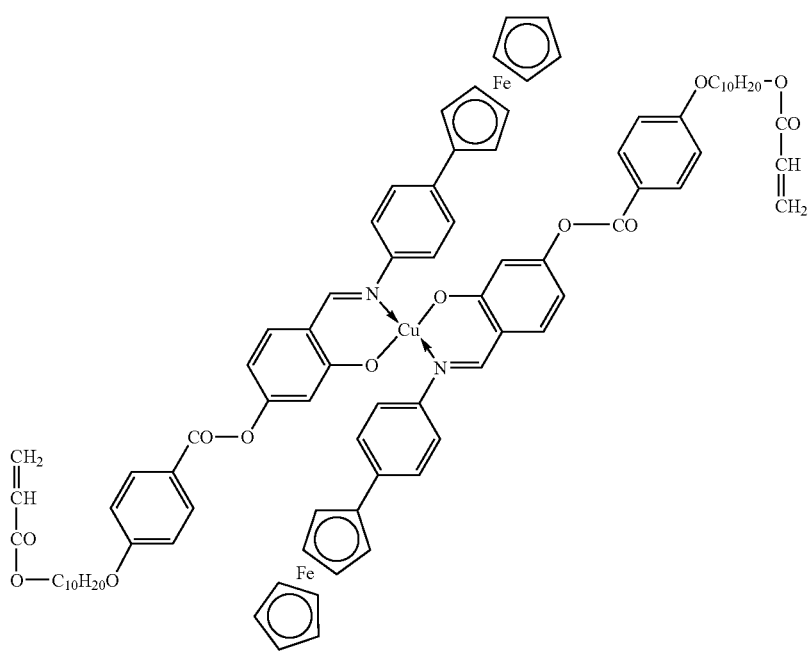

(N47)

The optically anisotropic film may be formed by coating a liquid crystal composition (coating liquid) containing a rod-like liquid crystalline compound or a polymerization initiator described later, and publicly-known arbitrary additives (for example, plasticizer, monomer, surfactant, cellulose ester, 1,3,5-triazine compound, chiral agent) onto the alignment film, and by fixing alignment of the liquid crystalline compound by a polymerization reaction.

(Discotic Liquid Crystalline Compound)

Examples of the discotic liquid crystalline compound include benzene derivatives described by C. Destrade et al. in Mol. Cryst., Vol. 71, p. 111 (1981); torxene derivatives described by C. Destrade et al. in Mol. Cryst., Vol. 122, p. 141 (1985) and Physics Lett, A, Vol. 78, p. 82 (1990); cyclohexane derivatives described by B. Kohne et al. in Angew. Chem., Vol. 96, p. 70 (1984); and azacrown-base and phenylacethylene-base macrocycles described by J. M. Lehn et al. in J. Chem. Commun., p. 1794 (1985), and by J. Zhang et al. in J. Am. Chem. Soc., Vol. 116, p. 2655 (1994). The discotic liquid crystalline compound includes also those having these compounds as a core placed at the center of the molecule, and having straight-chain alkyl groups, alkoxy groups, substituted benzoyloxy groups and so forth radially substituting the core, and shows liquid crystallinity. The discotic liquid crystalline compound is, however, not limited to them, so far as the molecule has a negative uniaxiality, and may be given with a regular alignment.

For the purpose of fixing molecules of the discotic liquid crystalline compound by polymerization, the molecule of the discotic liquid crystalline compound preferably has polymerizable groups as substituents bound to the discotic core. Direct bonding of the polymerizable groups to the discotic core may, however, make it difficult to keep the state of alignment during the polymerization reaction. A linking group is then introduced between the discotic core and each of the polymerizable groups. Accordingly, the discotic liquid crystalline compound having the polymerizable groups may preferably be the compounds expressed by the formula (3) below.

Formula (3)

In formula (3), D represents a discotic core; L represents a divalent linking group, P represents a polymerizable group, and n represents an integer from 4 to 12. Examples of the compounds expressed by the formula (3) will be shown below. In the individual examples, LP (or PL) means a combination of divalent linking group (L) and the polymerizable group (P).

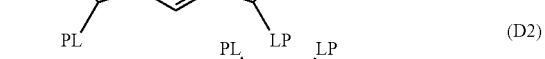

(D1)

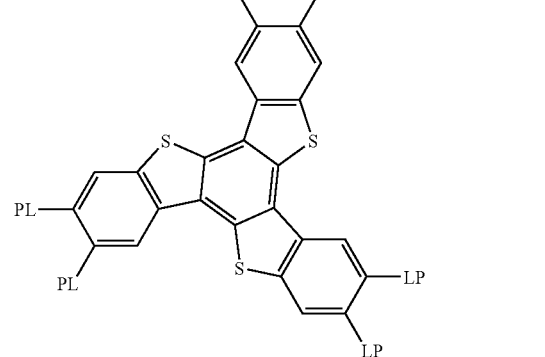

(D2)

-continued
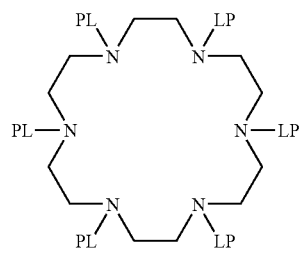
(D3)
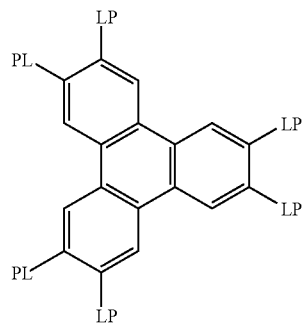
(D4)
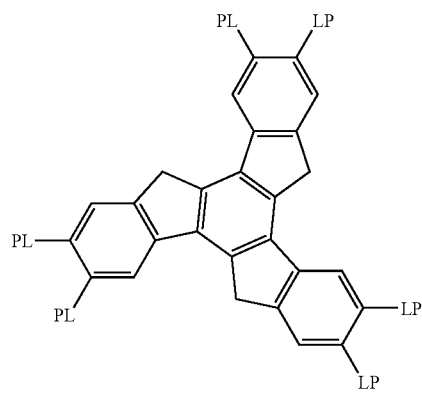
(D5)
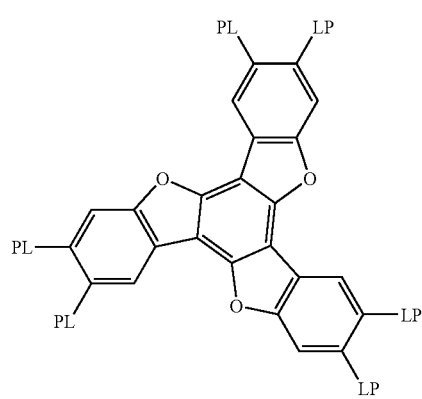
(D6)
-continued
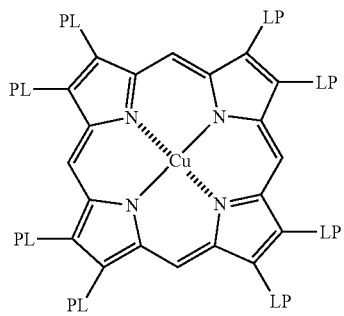
(D7)
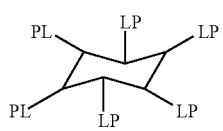
(D8)
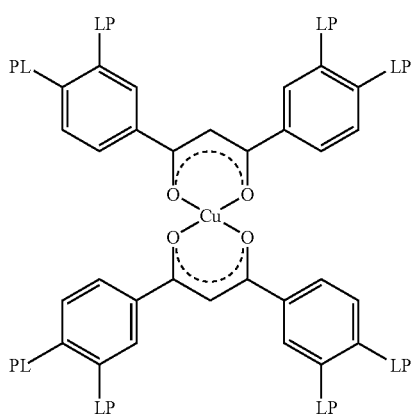
(D9)
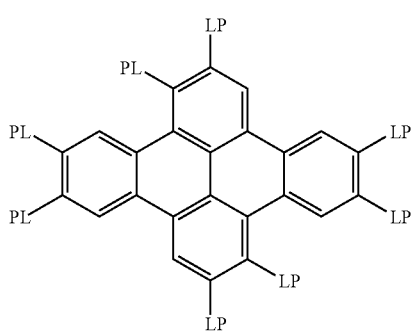
(D10)

-continued

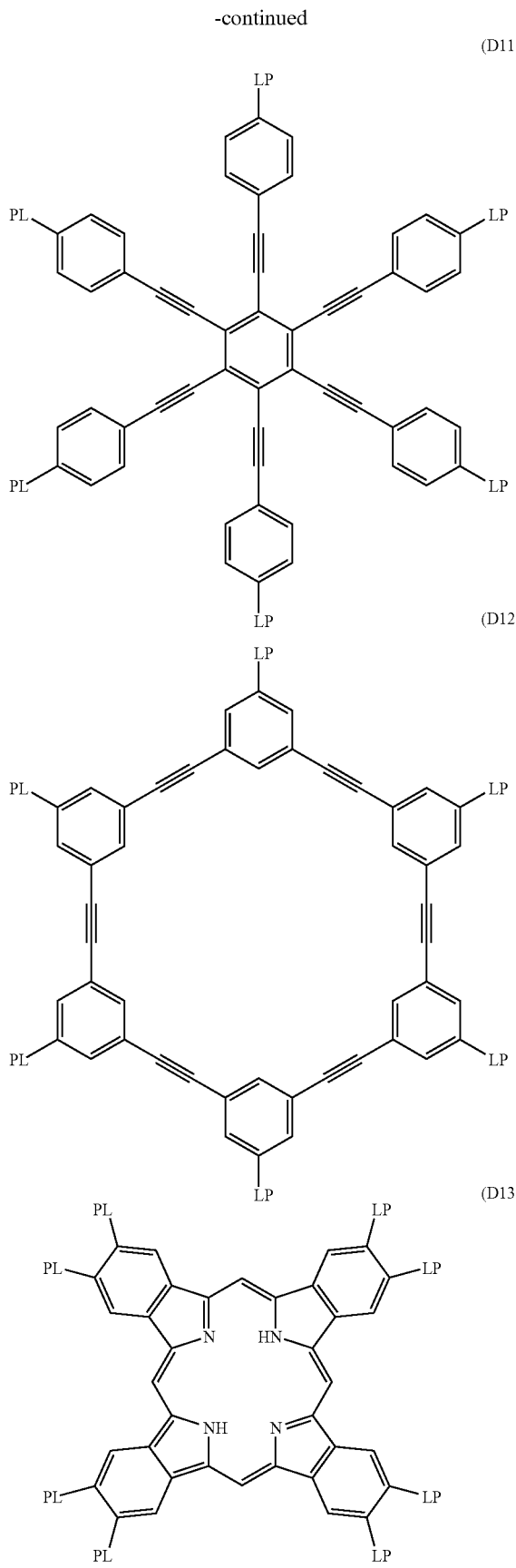

(D11)
(D12)
(D13)

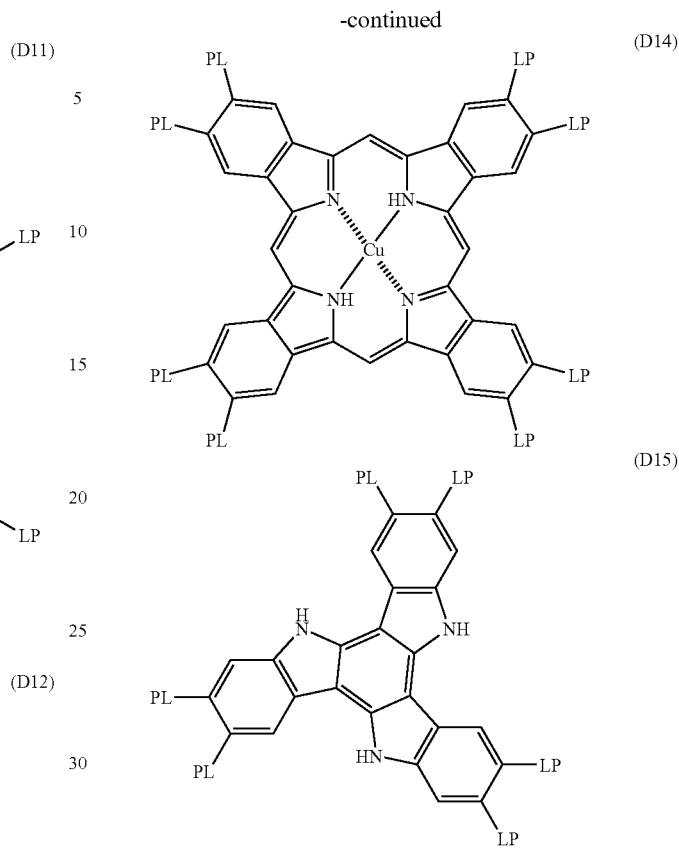

(D14)
(D15)

In the formula (3), the divalent linking group (L) may preferably be a divalent linking group selected from the group consisting of alkylene group, alkenylene group, arylene group, —CO—, —NH—, —O—, —S— and combinations of them. The divalent linking group (L) may more preferably be those having, as being combined, at least two divalent groups selected from the group consisting of alkylene group, arylene group, —CO—, —NH—, —O— and —S—. The divalent linking group (L) may most preferably be those having, as being combined, at least two divalent groups selected from the group consisting of alkylene group, arylene group, —CO— and —O—. The alkylene group preferably has 1 to 12 carbon atoms. The alkenylene group preferably has 2 to 12 carbon atoms. The arylene group preferably has 6 to 10 carbon atoms.

Examples of the divalent linking group (L) will be shown below. The left hand side may be bound to the discotic core (D), and the right hand side may be bound to the polymerizable group (P). AL represents an alkylene group or alkenylene group, and AR represents an arylene group. The alkylene group, alkenylene group and arylene group may have substituent(s) (for example, alkyl group).

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—

L11: —O—AL—
L12: —O—AL—O—
L13: —O—AL—O—CO—
L14: —O—AL—O—CO—NH—AL—
L15: —O—AL—S—AL—
L16: —O—CO—AR—O—AL—CO—
L17: —O—CO'AR—O—AL—O—CO—
L18: —O—CO—AR—O—AL—O—AL—O—CO—
L19: —O—CO—AR—O—AL—O—AL—O—AL—O—CO—
L20: —S—AL—
L21: —S—AL—O—
L22: —S—AL—O—CO—
L23: —S—AL—S—AL—
L24: —S—AR—AL—

The polymerizable group (P) expressed by the formula (3) may be determined depending on types of polymerization reaction. Examples of the polymerizable group (P) will be shown below.

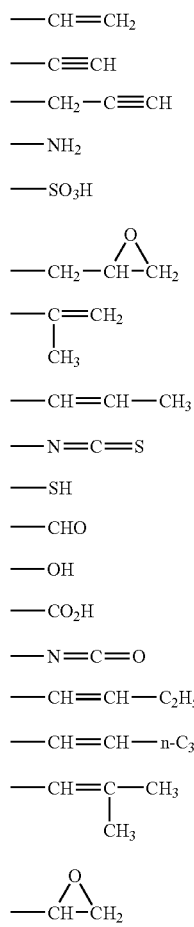

(P1) —CH=CH₂
(P2) —C≡CH
(P3) —CH₂—C≡CH
(P4) —NH₂
(P5) —SO₃H
(P6) —CH₂—CH(O)CH₂ (epoxy)
(P7) —C(CH₃)=CH₂
(P8) —CH=CH—CH₃
(P9) —N=C=S
(P10) —SH
(P11) —CHO
(P12) —OH
(P13) —CO₂H
(P14) —N=C=O
(P15) —CH=CH—C₂H₅
(P16) —CH=CH—n-C₃H₇
(P17) —CH=C(CH₃)—CH₃
(P18) —CH—CH₂ (epoxy)

The polymerizable group (P) is preferably any of unsaturated polymerizable groups (P1, P2, P3, P7, P8, P15, P16, P17) or epoxy groups (P6, P18), more preferably an unsaturated polymerizable groups, and still more preferably ethylene-base unsaturated polymerizable groups (P1, P7, P8, P15, P16, P17).

In the formula (3), as described in the above, n represents an integer from 4 to 12. A specific numeral may be determined depending on the species of the discotic core (D). A plurality of combinations of L and P may be different, but may preferably be identical.

When the discotic liquid crystalline compound is used, the optically anisotropic film may preferably be a layer having a negative birefringence, having a plane of the discotic structural unit inclined away from the surface of the cellulose acetate film, and having an angle formed between the plane of the discotic structural unit and the surface of the cellulose acetate film varied in the thickness-direction of the optically anisotropic film.

Angle (tilt angle) of the discotic plane unit generally increases or decreases in the thickness-direction of the optically anisotropic film, as the distance from the bottom surface of the optically anisotropic film increases. The tilt angle preferably increases with increase in the distance. Modes of change in the tilt angle may be exemplified by continuous increase, continuous decrease, intermittent increase, intermittent decrease, changes involving continuous increase and continuous decrease, and intermittent changes involving increase and decrease. The intermittent change involves a region where the tilt angle is kept unchanged at an intermediate point in the thickness-wise direction. The tilt angle preferably increases or decreases as a whole, even if the region having the tilt angle kept unchanged therein is included. Moreover, the tilt angle preferably increases as a whole, and particularly preferably changes in a continuous manner.

The tilt angle of the discotic plane unit at the support side may generally be adjustable by appropriately selecting a material of the discotic liquid crystalline compound or the alignment film, or by selecting a method of rubbing. The tilt angle of the discotic plane unit at the surface side (opposite to the support side) may generally be adjustable by appropriately selecting a material of the discotic liquid crystalline compound or other compounds used together with the discotic liquid crystalline compound. Examples of the other compounds used together with the discotic liquid crystalline compound include publicly-known compounds such as plasticizer, surfactant, polymerizable monomer and polymer. Moreover, also the degree of changes in the tilt angle may be adjustable by selection similarly to as described in the above.

The plasticizer, surfactant and polymerizable monomer used together with the discotic liquid crystalline compound may be any compounds so far as they are compatible with the discotic liquid crystalline compound, capable of inducing changes in the tilt angle of the discotic liquid crystalline compound, or so far as they do not inhibit the alignment. Among these, polymerizable monomers (for example, compounds having a vinyl group, vinyloxy group, acryloyl group and methacryloyl group) are preferable. It is preferable that the amount of addition of the compound may fall generally in the range from 1 to 50% by mass of the discotic liquid crystalline compound, and more preferably from 5 to 30% by mass.

The polymer used together with the discotic liquid crystalline compound may be any polymers so far as they are compatible with the discotic liquid crystalline compound, and are capable of inducing changes in the tilt angle of the discotic liquid crystalline compound. The polymer may be exemplified by cellulose ester. Preferable examples of the cellulose ester include cellulose acetate, cellulose acetate propionate, hydroxypropyl cellulose and cellulose acetate butyrate. In view of avoiding inhibition of alignment of the discotic liquid crystalline compound, it is preferable that the amount of addition of the polymer falls in the range generally from 0.1 to 10% by mass of the discotic liquid crystalline compound, more preferably from 0.1 to 8% by mass, and still more preferably from 0.1 to 5% by mass.

The optically anisotropic film may be produced using the discotic liquid crystalline compound typically by the procedures below. A solution having the discotic liquid crystalline compound and other compounds dissolved in the solvent thereof is coated on the alignment film, the coated solution is dried, heated to a temperature where a discotic nematic phase may be formed, and then cooled while keeping the state of alignment (discotic nematic phase) unchanged. Alternatively, the optically anisotropic film may be obtained also by coating a solution having the liquid crystalline compound and other compounds (additionally polymerizable monomer and photo-polymerization initiator, for example) dissolved in the solvent thereof, the coated solution is dried, heated to a temperature where a discotic-nematic phase may be formed, cooled while keeping the state of alignment (discotic nematic phase) unchanged, allowed to polymerize (typically by UV irradiation), and then cooled. Transition temperature between discotic nematic liquid phase and solid phase of the discotic liquid crystalline compound used for forming the optically anisotropic film preferably falls in the range from 70 to 300° C., and especially from 70 to 170° C.

(Fixation of Alignment State of Liquid Crystalline Molecules)

In the present invention, the liquid crystalline compound once aligned may be fixed while keeping the state of alignment unchanged, because the liquid crystalline compound has a polymerizable group, and thereby the alignment state of the optically anisotropic film may be fixed. The fixation may preferably be carried out by a polymerization reaction. Examples of the polymerization reaction manner include thermal polymerization using heat polymerization initiator, and photo-polymerization reaction using photo-polymerization initiator.

Examples of the photo-polymerization initiator include α-carbonyl compounds (U.S. Pat. Nos. 2,367,661 and 2367670), acyloin ethers (U.S. Pat. No. 2,448,828), α-hydrocarbon-substituted aromatic acyloin compounds (U.S. Pat. No. 2,722,512), polynuclear quinone compounds (U.S. Pat. Nos. 3,046,127 and 2,951,758), combinations of triaryl imidazole dimer and p-aminophenyl ketone (U.S. Pat. No. 3,549,367), acridine and phenazine compounds (Japanese Laid-Open Patent Publication No. S60-105667, U.S. Pat. No. 4,239,850), and oxadiazole compounds (U.S. Pat. No. 4,212,970).

The amount of the photo-polymerization initiator may preferably fall in the range from 0.01 to 20%, and more preferably 0.5 to 5% by mass, of the solid content of the coating liquid.

The irradiation of light for polymerizing the liquid crystalline compound preferably adopts ultraviolet radiation. Energy of irradiation preferably falls within the range from 20 mJ/cm$^2$ to 50 J/cm$^2$, more preferably from 20 to 5000 mJ/cm$^2$, and still more preferably 100 to 800 mJ/cm$^2$.

The irradiation of light may be carried out under heating conditions, in order to accelerate the photo-polymerization reaction. A protective layer may be provided on the optically anisotropic film. The optical compensation sheet may be produced as described in the above, by providing the optically anisotropic film on the cellulose acetate film.

(Alignment Film)

The optically anisotropic film may be produced using the alignment film. The alignment film may function so as to align molecules of the liquid crystalline compound in along any direction. Although the alignment film is often used for producing the optically anisotropic layer, after molecules of the liquid crystalline compound are aligned and fixed in the alignment state, it is no more necessary as a component of the optical compensation sheet. Namely, the alignment film is not a necessary component of the optical compensation sheet. Accordingly, once the molecules of the liquid crystalline compound are aligned on the alignment film and the state of alignment is fixed to thereby form the optically anisotropic film, only the optically anisotropic film on the alignment film may be transferred onto the support such as a cellulose acetate film, to thereby produce an optical compensation sheet composed only of the support having no alignment film formed thereon and the optically anisotropic film.

The alignment film has a function capable of controlling the alignment direction of liquid crystalline molecules. The alignment film may be provided by techniques such as rubbing of organic compound (preferably polymer), oblique vacuum evaporation of inorganic compound, formation of layer having micro-grooves, accumulation of organic compound (for example, ω-tricosanoic acid, dioctadecylmethyl ammonium chloride, methyl stearate) by the Langmuir-Blodgett method. There is also known an alignment film expressing an alignment function when applied with magnetic field or irradiation of light.

The alignment film is preferably formed by rubbing. Polyvinyl alcohol is a preferable polymer. Modified polyvinyl alcohol having hydrophobic groups bound thereto is especially preferable. Although the alignment film may be composed of only a single species of polymer, the film may more preferably be formed by rubbing a layer composed of two species of polymers crosslinked with each other. As at least one species of polymer, either of a polymer intrinsically crosslinkable per se, or a polymer crosslinkable by a crosslinking agent may preferably used. The alignment film may be formed by allowing a polymer, having a functional group originally or introduced later, to react with each other with the aid of light, heat, pH change and so forth; or by introducing a linking group derived from a crosslinking agent, which is a highly reactive compound, between the polymer chains, to thereby crosslink the polymer.

Such crosslinking may be carried out by coating a coating liquid containing the above-described polymer, or a mixture of such polymer and a crosslinking agent, onto the cellulose acetate film, and then by heating the coated solution. The crosslinking may be carried out at any time over the period from coating of the alignment film onto the cellulose acetate film up to acquisition of the optical compensation sheet, so far as a desirable level of durability of the optical compensation sheet may be ensured. Taking alignment property of the layer (optically anisotropic film) composed of the liquid crystalline compound formed on the alignment film into consideration, it is also preferable to thoroughly proceed crosslinking after the liquid crystalline compound is aligned. The crosslinking of the alignment film is carried out generally by applying a coating liquid for forming the alignment film to the surface of the cellulose acetate film, followed by drying under heating. It is preferable to adjust the temperature of heating of the coating liquid at this stage relatively low, and to allow the crosslinking of the alignment film to thoroughly proceed in the process of heating for forming the optically anisotropic film described later.

Polymer adoptable to the alignment film may be either of a polymer intrinsically crosslinkable per se, or a polymer crosslinkable by a crosslinking agent. Of course, some polymers are known to afford the both. Examples of the polymer include polymers such as polymethyl methacrylate, acrylate/methacrylate copolymer, styrene/maleimide copolymer, polyvinyl alcohol and modified polyvinyl alcohol, poly(N-methylol acrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropyrene, and polycarbonate; and other compounds such as gelatin and silane coupling agent. Examples of preferable polymer include water-soluble polymers such as poly(N-methylol acrylamide), carboxymethyl cellulose, gelatin, polyvinyl alcohol and modified polyvinyl alcohol. Gelatin, polyvinyl alcohol and modified polyvinyl alcohol may preferably be used, and polyvinyl alcohol and modified polyvinyl alcohol may more preferably be used. Alternatively, combined use of two or more types of polyvinyl alcohol or modified polyvinyl alcohol differing from each other in the degree of polymerization may be most preferable.

Examples of the polyvinyl alcohol include those having the degree of saponification in the range from 70 to 100%. The degree of saponification generally falls in the range from 80 to 100%, and more preferably falls in the range from 85 to 95%. The degree of polymerization of the polyvinyl alcohol preferably falls in the range from 100 to 3000. Examples of the modified polyvinyl alcohol include those modified by copolymerization, chain transfer, or block polymerization. Examples of modifier group involved in the modification by copolymerization include COONa, $Si(OH)_3$, $N(CH_3)_3.Cl$, $C_9H_{19}COO$, $SO_3$, Na and $C_{12}H_{25}$. Examples of modifier group involved in the modification by chain transfer include COONa, SH and $C_{12}H_{25}$. Examples of modifier group involved in the modification by block polymerization include COOH, $CONH_2$ and $C_6H_5$. Among these, unmodified or modified polyvinyl alcohols having the degree of saponification in the range from 80 to 100% may be preferable. Unmodified or modified polyvinyl alcohols having the degree of saponification in the range from 85 to 95% may be more preferable.

As the modified polyvinyl alcohol, those modified particularly by the compounds expressed by the formula below may be preferable. Such modified polyvinyl alcohol will be referred to as "specific modified polyvinyl alcohol", hereinafter.

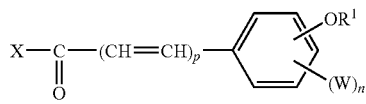

In the formula, $R^1$ represents an alkyl group, acryloylalkyl group, methacryloylalkyl group, or epoxy alkyl group; W represents a halogen atom, alkyl group, or alkoxy group; X represents an activated ester, acid anhydride, or atomic group necessary for forming acid halide; p represents 0 or 1; and n represents an integer from 0 to 4. The specific modified polyvinyl alcohol may preferably be those modified by the compound expressed by the formula below.

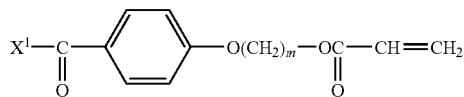

In the formula, $X^1$ represents an activated ester, acid anhydride, or atomic group necessary for forming acid halide, and m represents an integer from 2 to 24.

Polyvinyl alcohol allowed to react with the compounds expressed by these formulae include the above-described unmodified polyvinyl alcohol, and polyvinyl alcohol modified by copolymerization such as those modified by chain transfer, and block polymerization. Preferable examples of the specific modified polyvinyl alcohol are detailed in Japanese Laid-Open Patent Publication No. H9-152509. Methods of synthesizing these polymers, visible absorption spectrometry, and method of determining the degree of introduction of the modifier groups are detailed in Japanese Laid-Open Patent Publication No. H8-338913.

Examples of the crosslinking agent include aldehydes, N-methylol compounds, dioxane derivatives, compounds turned operable after being activated in the carboxyl groups, activated vinyl compounds, activated halogen compounds, isoxazoles, and dialdehyde starch. Examples of the aldehydes include formaldehyde, glyoxal, and glutaraldehyde. Examples of the N-methylol compounds include dimethylol urea and methylol dimethyl hydantoin. Examples of the dioxane derivatives include 2,3-dihydroxydioxane. Examples of the compounds turned operable after being activated in the carboxyl groups include carbenium, 2-naphthalene sulfonate, 1,1-bispyrrolidino-1-chloropyridinium, and 1-morpholinocarbonyl-3-(sulfonatoaminomethyl). Examples of the activated vinyl compounds include 1,3,5-triacroyl-hexahydro-s-triazine, bis(vinylsulfone)methane, and N,N'-methylenebis-[β-(vinylsulfonyl)propionamide]. Examples of the activated halogen compounds include 2,4-dichloro-6-hydroxy-s-triazine. These compounds may be used independently or in combination. These compounds are particularly preferable for the case where they are used together with the above-described, water-soluble polymers, especially polyvinyl alcohol and modified polyvinyl alcohol (including the above-described specific modified products). Taking productivity into consideration, use of aldehydes having high reactivity, especially glutaraldehyde, is preferable.

Amount of addition of the crosslinking agent relative to the polymer is not specifically limited. There is an improving tendency of moisture proofness of the polymer, as the amount of addition of the crosslinking agent increases. However, addition of the crosslinking agent to as much as exceeding 50% by mass of the polymer may degrade the aligning performance as the alignment film. The amount of addition of the crosslinking agent relative to the polymer preferably falls in the range from 0.1 to 20% by mass, and more preferably from 0.5 to 15% by mass. The alignment film contains unreacted crosslinking agent to some extent even after completion of the crosslinking reaction, wherein the amount of residual crosslinking agent may preferably be 1.0% by mass of below in the alignment film, and more preferably 0.5% by mass or below. If the amount of unreacted crosslinking agent remained in the alignment film is suppressed within the above-described range, the liquid crystal display device using the film may be no more causative of reticulation, and thereby a sufficient level of durability may desirably be obtained, even after use over a long period, or after being allowed to stand under an atmosphere of high temperature and high humidity over a long period.

The alignment film may be formed by coating a solution containing the above-described polymer, or the above-described polymer together with the crosslinking agent, onto the cellulose acetate film, drying (crosslinking) the coated film under heating, followed by rubbing. The crosslinking reaction may be allowed to proceed at an arbitrary timing, after the coating liquid was coated on the cellulose acetate film. For the case where a water-soluble polymer such as polyvinyl alcohol is used as a material for forming the alignment film, solvent for preparing the coating liquid may preferably be organic solvents expressing defoaming action such as methanol, or a mixed solvent of organic solvent and water. For the case where methanol is used as the organic solvent, ratio on the mass basis, expressed as water:methanol, is generally 0:100 to 99:1, and more preferably 0:100 to 91:9. Accordingly, foaming may be suppressed, and surface defects of the alignment film, and also of the optically anisotropic film, may distinctively be reduced.

Methods of coating may be exemplified by spin coating, dip coating, curtain coating, extrusion coating, bar coating and E-type coating. Among these, E-type coating is particularly preferable.

Thickness of the alignment film may preferably fall in the range from 0.1 to 10 μm. The drying under heating may be carried out in a temperature range of 20 to 110° C. In view of forming crosslinkage to a satisfiable degree, the temperature of heating may preferably fall in the range from 60 to 100° C., and more preferably from 80 to 100° C. The drying may be carried out for 1 minute to 36 hours, and preferably 5 to 30 minutes. Also pH may preferably be adjusted to a value optimum to a crosslinking agent to be adopted. For an exemplary case of using glutaraldehyde, pH may preferably fall in the range from 4.5 to 5.5, and particularly preferably falls on 5.

Rubbing may be carried out based on any methods widely adopted to alignment of liquid crystal of liquid crystal display device. More specifically, methods of obtaining alignment based on rubbing of the surface of the alignment film with paper, gauge, felt, rubber, nylon, polyester fabric or the like, in a certain direction, may be adoptable. In general, the rubbing is carried out several times using, for example, cloth averagedly flocked with fiber uniform in the length and thickness thereof.

Optical characteristics of the optical compensation sheet may be optimized depending on, for example, mode of the liquid crystal display device to which the polarizing plate of the present invention will be adopted, and Δn·d of the liquid crystal cell. For the case where the optical compensation sheet is composed only of the polymer film, preferable optical characteristics may be obtained by adjusting conditions for stretching of the polymer film, or by adding a retardation adjusting agent to the film. On the other hand, for the case where the optical compensation sheet is a stacked film having a support composed of a polymer film and an optically anisotropic film composed of a liquid crystalline composition, desired optical characteristics may be obtained by adjusting alignment of the liquid crystalline molecules, in the process of forming the optically anisotropic film. In an embodiment where the optical compensation sheet is given as the stacked film, the polymer film as the support may be optically anisotropic and may therefore be contributive to optical compensation, or may be optically isotropic and may therefore be not contributive to optical compensation.

«Protective Layer»

The polarizing plate of the present invention may further comprise a protective layer protecting the polarizer layer. The protective layer is preferably a polymer film. Examples of the polymer film used as the protective layer are same as those used for the optical compensation sheet and so forth.

«Release Paper»

An embodiment of the polarizing plate of the present invention may have the pressure-sensitive adhesive layer on the outermost side, and such an embodiment of the polarizing plate may preferably be stored and transported while having a release paper on its surface of the pressure-sensitive adhesive layer. When the polarizing plate is incorporated into the liquid crystal display device, the release paper may be removed, and the uncovered surface of the pressure-sensitive adhesive layer may be brought into contact to with other component, which is typically the surface of the substrate of the liquid crystal cell, so as to attach it thereto.

[Liquid Crystal Display Device]

The polarizing plate of the present invention may advantageously be employed in any liquid crystal display devices, especially to transmission-type liquid crystal display devices. One embodiment of the liquid crystal display device of the present invention comprises a liquid crystal cell and two polarizing plates disposed on both sides thereof, wherein one of which, or both of which are the polarizing plates of the present invention.

The liquid crystal cell is generally configured as having a liquid crystal held between two electrode substrates. In the TN-mode liquid crystal cell, rod-like liquid crystalline molecules are disposed substantially horizontally, as being twisted by 60 to 120° C., in the absence of applied voltage. The TN-mode liquid crystal cell has most widely been used for color TFT liquid crystal display devices, and has been described in a large number of literatures.

The polarizing plate of the present invention may advantageously be adopted to liquid crystal display devices employing any mode other than the TN mode, such as OCB (optically compensatory bend), VA (vertically aligned) and IPS (in-plane switching). In short, the liquid crystal display device of the present invention may be adoptable to TN, OCB, VA, IPS modes and so forth.

EXAMPLES

Paragraphs below will further specifically explain the present invention referring to Examples and Comparative Examples, without limiting the present invention. The lubricant compositions in Examples and Comparative Examples were evaluated according to the methods described below.

Example 1

Production of Cellulose Acetate Film

The composition below was placed in a mixing tank, and stirred under heating to dissolve the individual ingredients, to thereby prepare a cellulose acetate solution.

| <Composition of Cellulose Acetate Solution> | |
|---|---|
| Cellulose acetate, degree of acetylation 60.9% | 100 parts by mass |
| Triphenyl phosphate (plasticizer) | 7.9 parts by mass |
| Biphenyldiphenyl phosphate (plasticizer) | 3.9 parts by mass |
| Methylene chloride (first solvent) | 245 parts by mass |
| Methanol (second solvent) | 20 parts by mass |

In another mixing tank, 16 parts by mass of retardation enhancer shown below, 80 parts by mass of methylene chloride and 20 parts by mass of methanol were placed, and stirred under heating to thereby prepare a retardation enhancer solution. To 477 parts by mass of the cellulose acetate solution, 22 parts by mass of the retardation enhancer solution was mixed, and thoroughly mixed to prepare a dope. Amount of addition of the retardation enhancer was 3.0 parts by mass per 100 parts by mass of cellulose acetate.

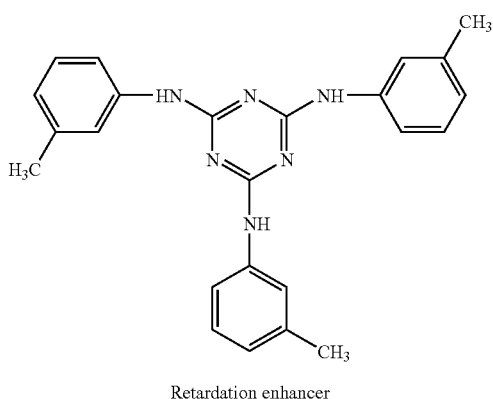

Retardation enhancer

The obtained dope was cast using a band casting machine. The film having a residual solvent content of 40% by mass was separated off from the band, and dried under an air blow at 120° C., while being fed at a 101% draw in the direction of feeding, and at a 3% expansion in the width-wide direction effected by a tenter. Tenter clips were detached, the film was dried under an air blow at 140° C. for 20 minutes, to thereby produce a cellulose acetate film (107 μm thick) having a residual solvent content of 0.3% by mass.

Thus produced cellulose acetate film was dipped into a 2.0 N potassium hydroxide solution (25° C.) for 2 minutes, neutralized using sulfuric acid, washed with water, dried, to thereby complete saponification.

(Formation of Alignment Film)

On thus produced cellulose acetate film, a coating liquid having a composition below was coated using a #14 wire bar coater to as much as 24 ml/m². The coating was dried under an air blow at 60° C. for 60 seconds, and further at 90° C. for 150 seconds. Next, thus-formed film was rubbed in the direction parallel to the longitudinal direction of the cellulose acetate film.

| <Composition of Coating Liquid for Forming Alignment Film> | |
|---|---|
| Modified polyvinyl alcohol shown below | 20 parts by mass |
| Water | 360 parts by mass |
| Methanol | 120 parts by mass |
| Glutaraldehyde (crosslinking agent) | 1.0 part by mass |

Modified polyvinyl alcohol

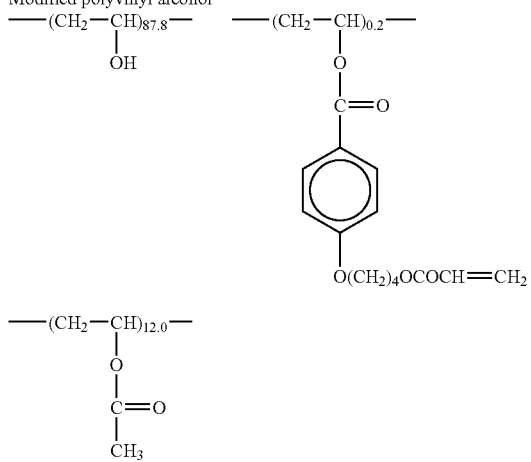

(Production of Optically Anisotropic Film, and Production of Optical Compensation Sheet)

To the alignment film, a coating liquid containing 91.0 g of discotic (liquid crystalline) compound shown below, 9.0 g of ethylene oxide-modified trimethylol propane triacrylate (V#360, from Osaka Organic Chemical Industry, Ltd.), 2.0 g of cellulose acetatebutyrate (CAB551-0.2, from Eastman Chemical Company), 0.5 g of cellulose acetate butyrate (CAB531-1, from Eastman Chemical Company), 3.0 g of photo-polymerization initiator (Irgacure 907, from Ciba Geigy AG), and 1.0 g of sensitizer (Kayacure DETX, from Nippon Kayaku Co., Ltd.), dissolved in 207 g of methyl ethyl ketone, was applied using a #3.6 wire bar to as much as 6.2 cc/m². The coated layer was heated in a thermostat zone at 130° C. for 2 minutes, to thereby align molecules of the discotic compound. Next, the layer was irradiated with ultraviolet light using a 120 W/cm high pressure mercury lamp for a minute under a 60° C. atmosphere, to thereby carry out polymerization of molecules of the discotic compound. The product was then allowed to cool to room temperature. An optically anisotropic layer was thus formed, and thereby the optical compensation sheet 1 was produced.

Regarding the optical compensation sheet 1, modulus of elasticity was measured using Tensilon (from Toyo Seiki K.K.) and it was found to be $3.89 \times 10^9$ Pa. Photoelastic coefficient of the optical compensation sheet 1 measured by an ellipsometer (M-150, from JASCO Corporation) was found to be $13 \times 10^{-12}$ (1/Pa).

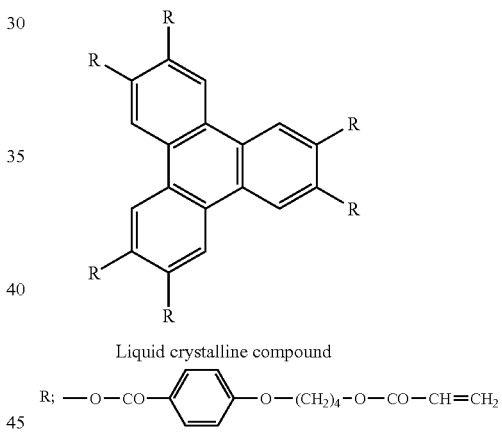

Liquid crystalline compound (Production of Polarizing Plate)

The stretched polyvinyl alcohol film was adsorbed with iodine to produce a polarizing film, and the optical compensation sheet produced as described in the above and saponified was attached to one surface of the polarizing film, so as to face the cellulose acetate film to the polarizing film, using a polyvinyl alcohol-base adhesive. The polarizer film was attached so that the transmission axis thereof was parallel to the slow axis of the cellulose acetate film. A commercially available cellulose triacetate film (80 μm thick, Fujitack TD80UF, from FUJIFILM Corporation) was saponified, and attached as a transparent protective film to the opposite surface of the polarizing plate using a polyvinyl alcohol-base adhesive.

A pressure-sensitive adhesive syrup was then prepared by dissolving 60 parts by mass of NR (pale crepe), 30 parts by mass of SBR (B/S=71/29), 10 parts by mass of polyisobutylene, 60 parts by mass of polyterpene resin (softening point=115° C.), 10 parts by mass of hydrogenated rosin glycerol ester, and 2 parts by mass of antioxidant (2,6-di-t-butyl- 4-cresol) into n-hexane so as to adjust the solid content to 20%. The pressure-sensitive adhesive layer was then formed by coating the pressure-sensitive adhesive syrup on the surface of the optically anisotropic film of the above-produced stack composed of a transparent protective layer, polarizing film and optical compensation sheet 1, so as to adjust the thickness of the pressure-sensitive adhesive layer to 30 µm on the dry basis.

A release paper was then placed on the surface of the pressure-sensitive adhesive layer. In this way, the polarizing plate configured identically to as shown in FIG. 2 was produced.

Photoelastic coefficient of thus-produced pressure-sensitive adhesive layer measured by the ellipsometer (M-150, from JASCO Corporation) was found to be $200\times10^{-12}$ (1/Pa).

Y value of the polarizing plate was consequently found to be $1.9\times10^{-4}$ (Evaluation of Polarizing Plate)

The release paper was removed respectively from two thus-produced polarizing plates, and the uncovered pressure-sensitive adhesive layers were placed one by one respectively on both surfaces of a quartz glass plate so that the transmission axes of two these polarizing plates were perpendicular to each other, and in the direction of 45° away from the horizontal line of the glass plate.

The glass plate having the polarizing plates attached on both surfaces thereof was allowed to stand for 17 hours in a drier conditioned to dryness at 60° C., the glass plate was taken out, one hour later, disposed on a backlight of a monitor "Syncmaster172X" manufactured by SAMSUNG; and light-leakage in the black state over the entire surface was evaluated by visual observation in a dark room. Substantially no light-leakage was observed in the periphery of the polarizing plate. The amount of leakage light was determined by measuring the luminance distribution using a luminance meter "BM-5A" manufactured by TOPCON TECHNOHOUSE CORPORATION. The transmittance of maximum leakage light was found to be 0.02%.

Example 2

Production of Cellulose Acetate Film

The composition below was placed in a mixing tank, and stirred under heating to dissolve the individual ingredients, to thereby prepare a cellulose acetate solution.

| <Composition of Cellulose Acetate Solution> | |
|---|---|
| Cellulose acetate having a degree of acetylation 60.9% | 100 parts by mass |
| Triphenyl phosphate (plasticizer) | 3.7 parts by mass |
| Biphenyldiphenyl phosphate (plasticizer) | 2.0 parts by mass |
| Methylene chloride (first solvent) | 250 parts by mass |
| Methanol (second solvent) | 20 parts by mass |

In another mixing tank, 16 parts by mass of retardation enhancer used in Example 1, 80 parts by mass of methylene chloride, and 20 parts by mass of methanol were placed, and stirred under heating to thereby prepare a retardation enhancer solution. To 477 parts by mass of the cellulose acetate solution, 22 parts by mass of the retardation enhancer solution was mixed, and thoroughly mixed to prepare a dope. Amount of addition of the retardation enhancer was 3.0 parts by mass per 100 parts by mass of cellulose acetate.

The obtained dope was cast using a band casting machine. The film having a residual solvent content of 40% by mass was separated off from the band, and dried under an air blow at 120° C., while being fed at a 101% draw in the direction of feeding, and at a 3% expansion in the width-wide direction effected by a tenter. Tenter clips were detached, the film was dried under an air blow at 140° C. for 20 minutes, to thereby produce a cellulose acetate film (107 µm thick) having a residual solvent content of 0.3% by mass.

Thus produced cellulose acetate film was dipped into a 2.0 N potassium hydroxide solution (25° C.) for 2 minutes, neutralized using sulfuric acid, washed with water, dried, to thereby complete saponification.

On thus-produced cellulose acetate film, the alignment film and the optically anisotropic film were formed in the same manner as Example 1, to thereby produce the optical compensation sheet 2. Modulus of elasticity of the optical compensation sheet 2 measured by Tensilon (from Toyo Seiki K.K.) was found to be $4.5\times10^9$ Pa. Photoelastic coefficient of the optical compensation sheet 2 measured by the ellipsometer (M-150, from JASCO Corporation) was found to be $13\times10^{-12}$ (1/Pa).

The polarizing plate configured similarly to as shown in FIG. 1 was produced in the same manner as Example 1, except that optical compensation sheet 2 was used in the place of the optical compensation sheet 1. Photoelastic coefficient of the pressure-sensitive adhesive layer of the polarizing plate measured by the ellipsometer (M-150, from JASCO Corporation) was found to be $200\times10^{-12}$ (1/Pa).

Y value of the polarizing plate was consequently found to be $4.6\times10^{-4}$.

(Evaluation)

Two polarizing plates thus produced were attached one by one respectively on both surfaces of a quartz glass plate, in the same manner as Example 1 so that the transmission axes of two these polarizing plates were perpendicular to each other, and in the direction 45° away from the horizontal line of the glass plate.

In the same manner as Example 1, the glass plate having the polarizing plate attached on both surfaces thereof was allowed to stand for 17 hours in a drier conditioned to dryness at 60° C., the glass plate was taken out, and light-leakage in the black state over the entire surface was evaluated by visual observation in a dark room. Substantially no light-leakage was observed in the periphery of the polarizing plate. The amount of leakage light was determined by measuring the luminance distribution using a luminance meter. The transmittance of maximum leakage light was found to be 0.05%.

Example 3

Preparation of Pressure-Sensitive Adhesive Syrup

A pressure-sensitive adhesive syrup was then prepared by dissolving 60 parts by mass of NR (pale crepe), 40 parts by mass of SBR (B/S=71/29), 10 parts by mass of polyisobutylene, 60 parts by mass of polyterpene resin (softening point=115° C.), 10 parts by mass of hydrogenated rosin glycerol ester, and 2 parts by mass of antioxidant (2,6-di-t-butyl-4-cresol) into n-hexane so as to adjust the solid content to 20%.

The polarizing plate configured similarly to as shown in FIG. 2 was produced in the same manner as Example 1, except that the pressure-sensitive adhesive layer was formed using the pressure-sensitive adhesive syrup prepared in the above.

Photoelastic coefficient of the resultant pressure-sensitive adhesive layer measured by the ellipsometer (M-150, from JASCO Corporation) was found to be $100 \times 10^{-12}$ (1/Pa).

Y value of the polarizing plate was consequently found to be $2.6 \times 10^{-4}$ (Evaluation)

Two polarizing plates thus produced were attached one by one respectively on both surfaces of a quartz glass plate in the same manner as Example 1 so that the transmission axes of two these polarizing plates were perpendicular to each other and in the direction of 45° away from the horizontal line of the glass plate.

In the same manner as Example 1, the glass plate having the polarizing plate attached on both surfaces thereof was allowed to stand for 17 hours in a drier conditioned to dryness at 60° C., the glass plate was taken out, and light-leakage in the black state over the entire surface was evaluated by visual observation in a dark room. Substantially no light-leakage was observed in the periphery of the polarizing plate. The amount of leakage light was determined by measuring the luminance distribution using a luminance meter. The transmittance of maximum leakage light was found to be 0.03%.

Example 4

The polarizing plate configured similarly to as shown in FIG. 2 was produced in the same manner as Example 2, except that the pressure-sensitive adhesive layer was formed using the pressure-sensitive adhesive syrup same as that prepared in Example 3.

Photoelastic coefficient of the resultant pressure-sensitive adhesive layer measured by the ellipsometer (M-150, from JASCO Corporation) was found to be $100 \times 10^{-12}$ (1/Pa).

Y value of the polarizing plate was consequently found to be $5.3 \times 10^{-4}$.

(Evaluation)

Two polarizing plates thus produced were attached one by one respectively on both surfaces of a quartz glass plate in the same manner as Example 1 so that the transmission axes of two these polarizing plates were perpendicular to each other and in the direction 45° away from the horizontal line of the glass plate.

In the same manner as Example 1, the glass plate having the polarizing plate attached on both surfaces thereof was allowed to stand for 17 hours in a drier conditioned to dryness at 60° C., the glass plate was taken out, and light-leakage in the black state over the entire surface was evaluated by visual observation in a dark room. Substantially no light-leakage was observed in the periphery of the polarizing plate. The amount of leakage light was determined by measuring the luminance distribution using a luminance meter. The transmittance of maximum leakage light was found to be 0.05%.

Example 5

Formation of Pressure-Sensitive Adhesive Layer

A pressure-sensitive adhesive syrup was prepared according to the method described below. Abbreviations for the substances employed herein are as follows:
BA: n-butylacrylate
MA: methyl acrylate
AA: acrylic acid
2-HEMA: hydroxyethyl methacrylate
BZMA: benzyl methacrylate
PHMA: phenyl methacrylate
AIBN: azobis(isobutyronitrile)
EA(EAc): ethyl acetate In a 1000-cc reaction vessel configured as allowing nitrogen gas to circulate therein during synthesis of copolymer, and equipped with a cooling device so as to facilitate temperature regulation, a mixture of monomers composed of 49.5 parts by mass of n-butylacrylate (BA), 3 parts by mass of acrylic acid (AA), 0.5 parts by mass of 2-hydroxyethyl (meth)acrylate (2-HEMA), and 100 parts by mass of benzyl methacrylate (BZMA), was placed. One hundred parts by mass of ethyl acetate (EA) was then placed as a solvent. Next, oxygen was purged from the system by filling the system with nitrogen gas for 20 minutes, the mixture was homogenized while being kept at 65° C., added with 0.03 parts by mass of azobis(isobutyronitrile) (AIBN) as a reaction initiator, as being diluted to 50% concentration in ethyl acetate, and allowed to react for 10 hours, to thereby obtain a final acrylic polymer.

The acrylic polymer solution (solid content of approximately 50%) obtained by the above-described copolymerization process was thoroughly mixed. Next, 1.2 parts by mass of tolylene diisocyanate adduct (TDI-1) of trimethylolpropane was placed as an isocyanate-base crosslinking agent, as being respectively diluted to 10% by mass in ethyl acetate solution, the mixture was homogeneously mixed while being diluted to an appropriate concentration in terms of coating property, to thereby obtain a pressure-sensitive adhesive syrup.

The polarizing plate configured similarly to as shown in FIG. 2 was produced in the same manner as Example 2, except that the pressure-sensitive adhesive layer was formed using the pressure-sensitive adhesive syrup prepared in the above.

Photoelastic coefficient of the resultant pressure-sensitive adhesive layer measured by the ellipsometer (M-150, from JASCO Corporation) was found to be $10 \times 10^{-12}$ (1/Pa).

Y value of the polarizing plate was consequently found to be $5.9 \times 10^{-4}$.

(Evaluation)

Two polarizing plates thus produced were attached one by one respectively on both surfaces of a quartz glass plate in the same manner as Example 1 so that the transmission axes of two these polarizing plates were perpendicular to each other and in the direction of 45' away from the horizontal line of the glass plate.

In the same manner as Example 1, the glass plate having the polarizing plate attached on both surfaces thereof was allowed to stand for 17 hours in a drier conditioned to dryness at 60° C., the glass plate was taken out, and light-leakage in the black state over the entire surface was evaluated by visual observation in a dark room. Substantially no light-leakage was observed in the periphery of the polarizing plate. The amount of leakage light was determined by measuring the luminance distribution using a luminance meter. The transmittance of maximum leakage light was found to be 0.055%.

Example 6

The polarizing plate configured similarly to as shown in FIG. 2 was produced in the same manner as Example 1, except that the pressure-sensitive adhesive layer was formed using the pressure-sensitive adhesive syrup prepared in Example 5.

Photoelastic coefficient of the resultant pressure-sensitive adhesive layer measured by the ellipsometer (M-150, from JASCO Corporation) was found to be $10 \times 10^{-12}$ (1/Pa).

Y value of the polarizing plate was consequently found to be $3.3 \times 10^{-4}$.

(Evaluation)

Two polarizing plates thus produced were attached one by one respectively on both surfaces of a quartz glass plate in the same manner as Example 1 so that the transmission axes of two these polarizing plates were perpendicular to each other and in the direction of 45° away from the horizontal line of the glass plate.

In the same manner as Example 1, the glass plate having the polarizing plate attached on both surfaces thereof was allowed to stand for 17 hours in a drier conditioned to dryness at 60° C., the glass plate was taken out, and light-leakage in the black state over the entire surface was evaluated by visual observation in a dark room. Substantially no light-leakage was observed in the periphery of the polarizing plate. The amount of leakage light was determined by measuring the luminance distribution using a luminance meter. The transmittance of maximum leakage light was found to be 0.04%.

Example 7

Formation of Pressure-Sensitive Adhesive Layer

A pressure-sensitive adhesive syrup was prepared according to the method described below. Abbreviations for the substances employed herein are as follows:
BA: n-butylacrylate
MA: methyl acrylate
AA: acrylic acid
2-HEMA: hydroxyethyl methacrylate
BZMA: benzyl methacrylate
PHMA: phenyl methacrylate
AIBN: azobis(isobutyronitrile)
EA(EAc): ethyl acetate In a 1000-cc reaction vessel configured as allowing nitrogen gas to circulate therein during synthesis of copolymer, and equipped with a cooling device so as to facilitate temperature regulation, a mixture of monomers composed of 49.5 parts by mass of BA, 3 parts by mass of AA, 0.5 parts by mass of 2-HEMA and 95 parts by mass of PHMA was placed. One hundred parts by mass of ethyl acetate (EA) was then placed as a solvent. Next, oxygen was purged from the system by filling the system with nitrogen gas for 20 minutes, the mixture was homogenized while being kept at 65° C., added with 0.03 parts by mass of azobis (isobutyronitrile) (AIBN) as a reaction initiator, as being diluted to 50% concentration in ethyl acetate, and allowed to react for 10 hours, to thereby obtain a final acrylic polymer.

The acrylic polymer solution (solid content of approximately 50%) obtained by the above-described copolymerization process was thoroughly mixed. Next, 1.2 parts by mass of tolylene diisocyanate adduct (TDI-1) of trimethylolpropane was placed as an isocyanate-base crosslinking agent, as being respectively diluted to 10% by mass in ethyl acetate solution, the mixture was homogeneously mixed while being diluted to an appropriate concentration in terms of coating property, to thereby obtain a pressure-sensitive adhesive syrup.

The polarizing plate configured similarly to as shown in FIG. 2 was produced in the same manner as Example 1, except that the pressure-sensitive adhesive layer was formed using the pressure-sensitive adhesive syrup prepared in the above.

Photoelastic coefficient of the resultant pressure-sensitive adhesive layer measured by the ellipsometer (M-150, from JASCO Corporation) was found to be $10 \times 10^{-12}$ (1/Pa).

Y value of the polarizing plate was consequently found to be $3.3 \times 10^{-4}$ (Evaluation)

Two polarizing plates thus produced were attached one by one respectively on both surfaces of a quartz glass plate in the same manner as Example 1 so that the transmission axes of two these polarizing plates were perpendicular to each other and in the direction of 45° away from the horizontal line of the glass plate.

In the same manner as Example 1, the glass plate having the polarizing plate attached on both surfaces thereof was allowed to stand for 17 hours in a drier conditioned to dryness at 60° C., the glass plate was taken out, and light-leakage in the black state over the entire surface was evaluated by visual observation in a dark room. Substantially no light-leakage was observed in the periphery of the polarizing plate. The amount of leakage light was determined by measuring the luminance distribution using a luminance meter. The transmittance of maximum leakage light was found to be 0.035%.

Comparative Example

A comparative polarizing plate was produced in the same manner as Example 1, except that a pressure-sensitive adhesive layer PET-S (W) from Sanritz Corporation (30 μm thick) was placed as the pressure-sensitive adhesive layer on the surface of the optically anisotropic film.

Photoelastic coefficient of the resultant pressure-sensitive adhesive layer measured by the ellipsometer (M-150, from JASCO Corporation) was found to be $-750 \times 10^{-12}$ (1/Pa).

Y value of the polarizing plate was consequently found to be $8.6 \times 10^{-4}$.

(Evaluation)

Two polarizing plates thus produced were attached one by one respectively on both surfaces of a quartz glass plate in the same manner as Example 1 so that the transmission axes of two these polarizing plates were perpendicular to each other and in the direction of 45° away from the horizontal line of the glass plate.

In the same manner as Example 1, the glass plate having the polarizing plate attached on both surfaces thereof was allowed to stand for 17 hours in a drier conditioned to dryness at 60° C., the glass plate was taken out, and light-leakage in the black state over the entire surface was evaluated by visual observation in a dark room. Light-leakage was observed in the periphery of the polarizing plate. The amount of leakage light was determined by measuring the luminance distribution using a luminance meter. The transmittance of maximum leakage light was found to be 0.1%.

Figure 3:
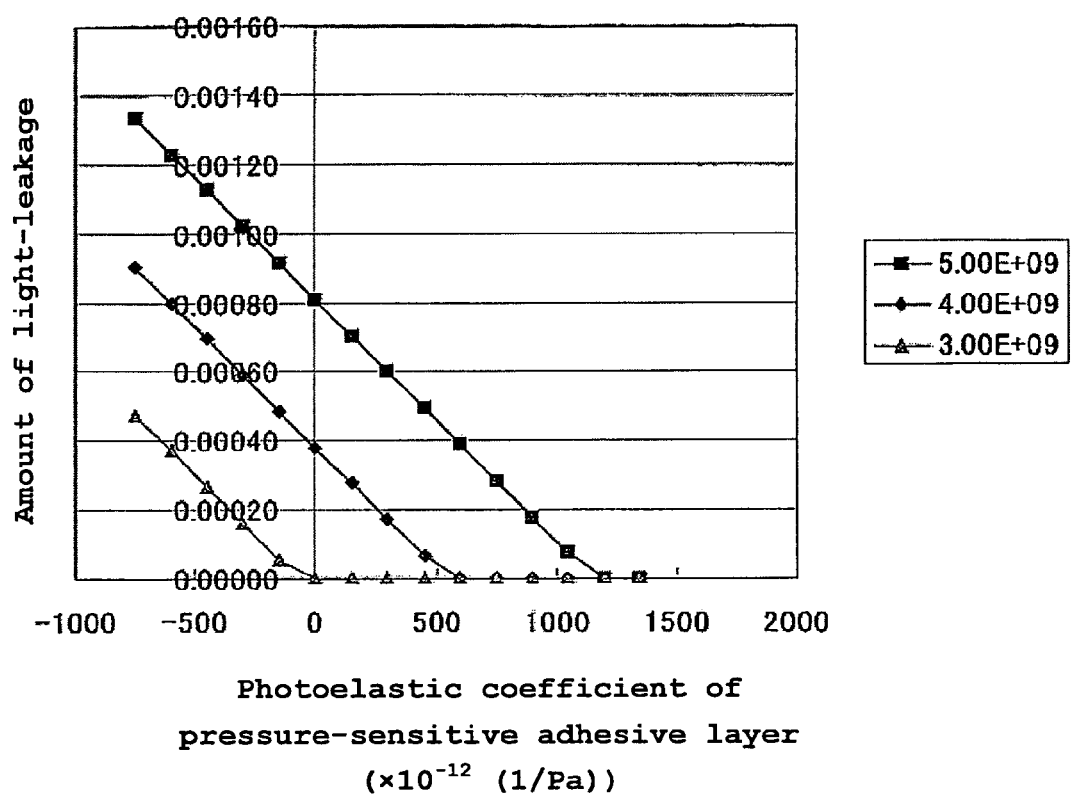
FIG. 3 is a graph showing amount of light-leakage of polarizing plates produced by combining each of optical compensation sheets having an modulus of elasticity of $5\times10^9$ Pa, $4\times10^9$ Pa and $3\times10^9$ Pa with each of pressure-sensitive adhesive layer having various photo-elastic moduli, plotted against photoelastic coefficient of the pressure-sensitive adhesive layer.
Figure 4:
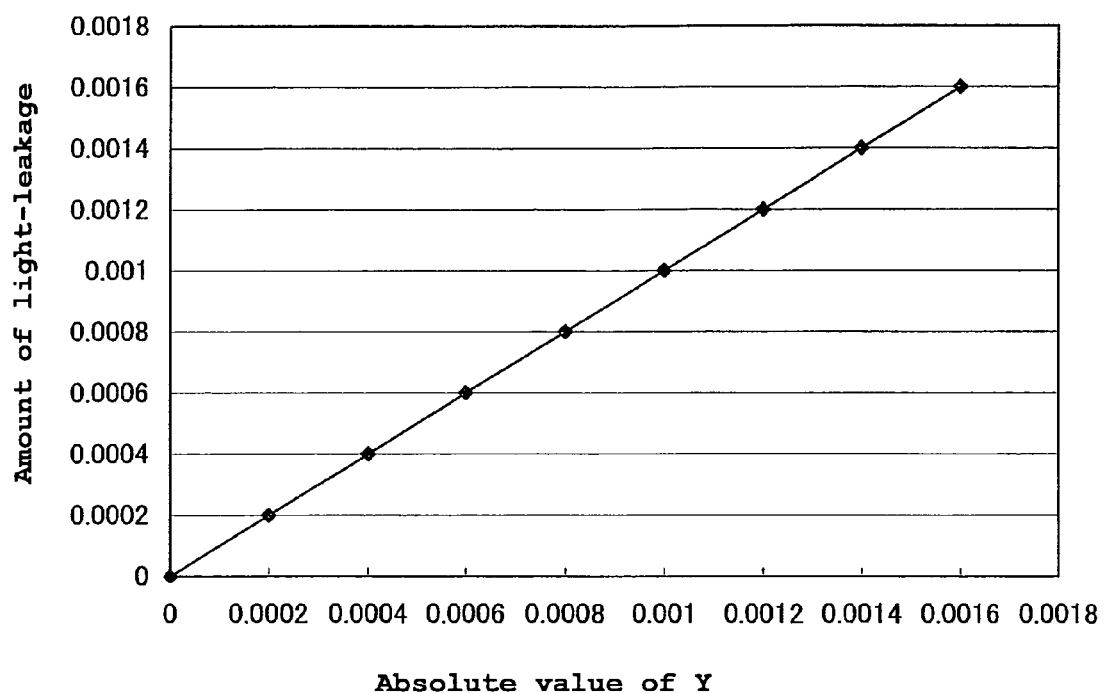
FIG. 4 is a graph showing amount of light-leakage plotted against absolute value of Y of each of the polarizing plates of Examples.

Various polarizing plates having a configuration similar to that of Example 1 were produced, by combining each of the pressure-sensitive adhesive layers, which were produced using various pressure-sensitive adhesive, showing various photo-elastic moduli, with each of the optical compensation sheets showing elastic moduli of $5.0 \times 10^9$, $4.0 \times 10^9$ and $3.0 \times 10^9$ Pa, and evaluated in terms of the amount of leakage light generated due to thermal distortion in the same manner as Example 1. FIG. 3 shows a graph obtained by plotting thus measured amount of light-leakage against photoelastic coefficient of the pressure-sensitive adhesive layer, and FIG. 4 shows a graph obtained by plotting thus measured amount of light-leakage against absolute value of Y of the polarizing plate. It is to be noted that the ordinate in FIG. 3 represents the amount of leakage light generated due to thermal distortion, and will represent transmittance (%) if values of the amount of leakage light are multiplied by 100.

The present inventor confirmed that substantially no light-leakage may visually be observed, if the amount of leakage light (values on the ordinate in FIGS. 3 and 4) is equal to or smaller than 0.0006, in other words, the if the transmittance of leakage light is equal to or smaller than 0.06%, and thereby the above-described objects may be achieved.

Figure 5:
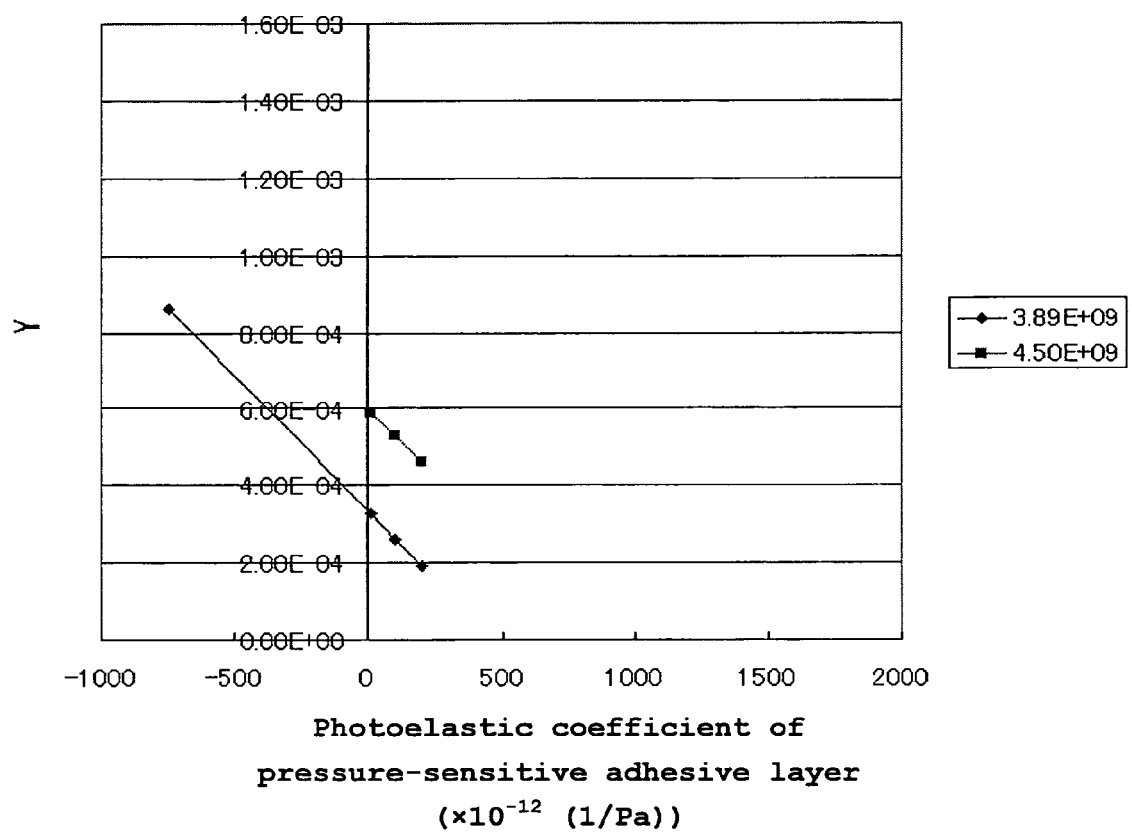
FIG. 5 is a graph showing Y value of each of Examples and Comparative Examples plotted against photoelastic coefficient of the pressure-sensitive adhesive layer.

And FIG. 5 shows a graph obtained by plotting Y value of each of Examples and Comparative Examples against photo-elastic coefficient of the pressure-sensitive adhesive layer. It is understandable that, although all of the Y values of the polarizing plates of Examples 1 to 7 were smaller than 0.0006, the Y value of the polarizing plate of Comparative Example was more than 0.0006 regardless of employing Optical compensation sheet 1 as well as Examples 1, 3, 6 and 7. Therefore, as mentioned above, according to Examples of the invention, the amount of light-leakage (transmittance) is smaller than 0.06%; and, according to Comparative Example, the amount of light-leakage (transmittance) is more than 0.06%.

From these results of Examples and Comparative Examples, and from the results shown in FIGS. 3 and 4, it is understandable that the liquid crystal display devices employing the polarizing plates having absolute values of Y equal to or smaller than 0.0006 are successfully suppressed in light-leakage generated due to thermal distortion.

What is claimed is:

1. A polarizing plate comprising at least a polarizing film, a pressure-sensitive adhesive layer, and an optical compensation sheet; and having an absolute value of Y, defined by the following equation, equal to or smaller than $6.0\times10^{-4}$:

$$Y=-7.0\times10^5\times Cn+4.3\times10^{-13}\times E-1.34\times10^{-3}$$

where Cn (1/Pa) is photoelastic modulus of said pressure-sensitive adhesive layer and E(Pa) is modulus of elasticity of said optical compensation sheet;
wherein said pressure-sensitive adhesive layer comprises an acrylic pressure-sensitive adhesive; and
wherein said acrylic pressure-sensitive adhesive comprises a polymer comprising a repeating unit derived from a monomer represented by formula (I) below:

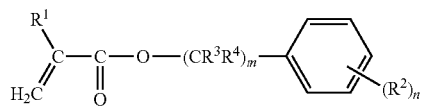

Formula (I)

where $R^1$ represents a hydrogen atom or methyl group; $R^2$ represents a hydrogen atom or substituent; each of $R^3$ and $R^4$ independently represents a hydrogen atom or substituent; m represents an integer of 0 or larger, n represents an integer from 0 to 5, and for the case where each of m and n is an integer of 2 or larger, a plurality of each of $R^2$, $R^3$ and $R^4$ may be same or different.

2. The polarizing plate of claim 1, wherein said acrylic pressure-sensitive adhesive comprises a polymer comprising a repeating unit derived from a monomer of which homopolymer has a positive photoelastic coefficient.

3. The polarizing plate of claim 1, wherein said optical compensation sheet has a photoelastic coefficient equal to or smaller than $50\times10^{-12}$ (1/Pa).

4. A liquid crystal display device comprising at least a liquid crystal cell and the polarizing plate as set forth in claim 1.

5. The liquid crystal display device of claim 4, wherein said polarizing plate is disposed so that a surface of the pressure-sensitive adhesive layer contacts a surface of said liquid crystal cell.

6. A polarizing plate of comprising at least a polarizing film, a pressure-sensitive adhesive layer, and an optical compensation sheet; and having an absolute value of Y, defined by the following equation, equal to or smaller than $6.0\times10^{-4}$:

$$Y=-7.0\times10^5\times Cn+4.3\times10^{-13}\times E-1.34\times10^{-3}$$

where Cn (1/Pa) is photoelastic modulus of said pressure-sensitive adhesive layer and E(Pa) is modulus of elasticity of said optical compensation sheet.
wherein said pressure-sensitive adhesive layer comprises an acrylic pressure-sensitive adhesive;
wherein said acrylic pressure-sensitive adhesive comprises a copolymer comprising at least one repeating unit derived from a monomer of which homopolymer has a positive photoelastic coefficient; and
wherein said copolymer comprises at least one repeating unit derived from a compound represented by formula (I) below:

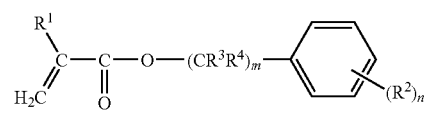

Formula (I)

where $R^1$ represents a hydrogen atom or methyl group; $R^2$ represents a hydrogen atom or substituent; each of $R^3$ and $R^4$ independently represents a hydrogen atom or substituent; m represents an integer of 0 or larger, n represents an integer from 0 to 5, and for the case where each of m and n is an integer of 2 or larger, a plurality of each of $R^2$, $R^3$ and $R^4$ may be same or different.

7. The polarizing plate of claim 6, wherein said copolymer comprises at least one repeating unit derived from one selected from the group consists of aromatic acrylate monomers and aromatic methacrylate monomers.

8. The polarizing plate of claim 6, wherein said optical compensation sheet has a photoelastic coefficient equal to or smaller than $50\times10^{-12}$ (1/Pa).

9. A liquid crystal display device comprising at least a liquid crystal cell and the polarizing plate as set forth in claim 6.

10. The liquid crystal display device of claim 9, wherein said polarizing plate is disposed so that a surface of the pressure-sensitive adhesive layer contacts a surface of said liquid crystal cell.

* * * * *